United States Patent
Vidrine et al.

(10) Patent No.: US 11,188,638 B2
(45) Date of Patent: Nov. 30, 2021

(54) FINE-GRAINED MEMORY ADDRESS SPACE LAYOUT RANDOMIZATION

(71) Applicant: Apple Inc., Cupertino, CA (US)

(72) Inventors: Jacques A. Vidrine, San Francisco, CA (US); Nicholas C. Allegra, Fort Lauderdale, FL (US); Simon P. Cooper, Cupertino, CA (US); Gregory D. Hughes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/409,654

(22) Filed: May 10, 2019

(65) Prior Publication Data

US 2020/0034527 A1   Jan. 30, 2020

Related U.S. Application Data

(62) Division of application No. 14/503,212, filed on Sep. 30, 2014, now Pat. No. 10,311,228.

(51) Int. Cl.
*G06F 21/52* (2013.01)
*G06F 12/02* (2006.01)

(52) U.S. Cl.
CPC .......... *G06F 21/52* (2013.01); *G06F 12/0284* (2013.01); *G06F 2221/033* (2013.01)

(58) Field of Classification Search
CPC .. G06F 21/53; G06F 12/1408; G06F 12/0253; G06F 12/0284; G06F 21/52; G06F 2221/033
USPC ......................................................... 726/22
See application file for complete search history.

(56) References Cited

U.S. PATENT DOCUMENTS

| 5,386,536 A | 1/1995 | Courts et al. |
| 5,440,706 A * | 8/1995 | Juri .................. H04N 19/60 711/202 |
| 6,216,214 B1 | 4/2001 | Bryg et al. |
| 6,411,302 B1 | 6/2002 | Chiraz |
| 7,546,430 B1 * | 6/2009 | Miller .............. G06F 12/1408 711/163 |
| 7,562,205 B1 | 7/2009 | Case et al. |
| 7,872,657 B1 | 1/2011 | Edmondson et al. |
| 8,171,256 B1 | 5/2012 | Satish et al. |
| 8,255,922 B1 | 8/2012 | Fresko et al. |
| 8,327,111 B2 * | 12/2012 | Cummins ........... G06F 12/0253 711/203 |
| 8,621,169 B2 | 12/2013 | Whitehouse et al. |

(Continued)

OTHER PUBLICATIONS

Linking and Loading, Chapter 1, Revision: 2.3, Date: Jun. 30, 1999, 20 pages.

(Continued)

*Primary Examiner* — Bryan F Wright
(74) *Attorney, Agent, or Firm* — Womble Bond Dickinson (US) LLP

(57) ABSTRACT

A data processing system can use a method of fine-grained address space layout randomization to mitigate the system's vulnerability to return oriented programming security exploits. The randomization can occur at the sub-segment level by randomizing clumps of virtual memory pages. The randomized virtual memory can be presented to processes executing on the system. The mapping between memory spaces can be obfuscated using several obfuscation techniques to prevent the reverse engineering of the shuffled virtual memory mapping.

16 Claims, 17 Drawing Sheets

(56) References Cited

U.S. PATENT DOCUMENTS

| | | | |
|---|---|---|---|
| 8,646,050 B2 | 2/2014 | Vidrine et al. | |
| 8,694,738 B2 | 4/2014 | Bhattacharjee et al. | |
| 9,069,782 B2* | 6/2015 | Yang | G06F 21/53 |
| 9,250,937 B1 | 2/2016 | Franz et al. | |
| 9,304,944 B2 | 4/2016 | Pong et al. | |
| 2002/0013889 A1 | 1/2002 | Schuster et al. | |
| 2004/0210735 A1 | 10/2004 | Shieh | |
| 2007/0006178 A1 | 1/2007 | Tan | |
| 2007/0192762 A1* | 8/2007 | Eichenberger | G06F 8/443 |
| | | | 717/159 |
| 2008/0127142 A1 | 5/2008 | Wrighton et al. | |
| 2008/0140968 A1 | 6/2008 | Doshi et al. | |
| 2008/0189529 A1 | 8/2008 | Bohizic et al. | |
| 2008/0301256 A1 | 12/2008 | McWilliams et al. | |
| 2009/0178028 A1 | 7/2009 | Best et al. | |
| 2010/0049922 A1 | 2/2010 | Aronovich et al. | |
| 2011/0099387 A1 | 4/2011 | Gremaud et al. | |
| 2011/0138476 A1 | 6/2011 | Black et al. | |
| 2011/0191848 A1 | 8/2011 | Zorn et al. | |
| 2012/0260106 A1 | 10/2012 | Zaks et al. | |
| 2013/0024936 A1* | 1/2013 | Jakobsson | G06F 21/554 |
| | | | 726/23 |
| 2013/0086299 A1 | 4/2013 | Epstein | |
| 2013/0086550 A1 | 4/2013 | Epstein | |
| 2013/0276056 A1 | 10/2013 | Epstein | |
| 2013/0283245 A1 | 10/2013 | Black et al. | |
| 2013/0347111 A1 | 12/2013 | Karta et al. | |
| 2014/0020112 A1 | 1/2014 | Goodes | |
| 2014/0059525 A1 | 2/2014 | Jawa et al. | |
| 2014/0245260 A1 | 8/2014 | Joisha | |
| 2014/0282534 A1 | 9/2014 | Sehr et al. | |
| 2015/0019834 A1 | 1/2015 | Loh et al. | |
| 2015/0047049 A1* | 2/2015 | Panchenko | G06F 21/14 |
| | | | 726/26 |
| 2015/0143028 A1 | 5/2015 | Jung et al. | |
| 2015/0199280 A1 | 7/2015 | Molnar et al. | |
| 2015/0206558 A1 | 7/2015 | Ni et al. | |
| 2015/0261686 A1 | 9/2015 | Nampoothiri et al. | |
| 2015/0301761 A1* | 10/2015 | Sijstermans | G06F 3/0644 |
| | | | 711/163 |
| 2016/0092675 A1* | 3/2016 | Vidrine | G06F 12/0284 |
| | | | 726/22 |

OTHER PUBLICATIONS

Hovav Shacham, The Geometry of Innocent Flesh on the Bone: Return-into-libc without Function Calls (on the K86), Sep. 5, 2007, 29 pages.

Kevin Z. Snow et al., "Just-In Time Code Reuse: On the Effectiveness of Fine-Grained Address Space Layout Randomization", 2013 IEEE Symposium on Security and Privacy, 15 pages.

U.S. Appl. No. 14/503,195, filed Sep. 30, 2014.

U.S. Appl. No. 16/409,662, filed May 10, 2019.

\* cited by examiner

FINE-GRAINED MEMORY ADDRESS SPACE LAYOUT RANDOMIZATION

BACKGROUND OF THE DISCLOSURE

This application is a divisional of co-pending U.S. application Ser. No. 14/503,212 filed Sep. 30, 2014.

Malicious individuals who seek to compromise the security of a computer system often exploit programming errors or other system vulnerabilities to gain unauthorized access to a system. In the past, attackers were able to exploit vulnerabilities, such as weak bounds checking on memory buffers or input strings to inject arbitrary instructions into the address space of a process. The attacker can then subvert the process's control flow to cause the process to perform operations of the attacker's choosing using the process's credentials.

Secure programming practices along with hardware-based security technology have reduced the attack surface over which exploitation techniques may be attempted. Some computer systems include countermeasures to prevent the injection and execution of arbitrary code. In response, 'return-oriented programming' (ROP) techniques were developed. Using such techniques, attackers are able to utilize existing instructions in memory to cause a computer system to unwittingly perform some set of arbitrary instructions that may result in a compromised computing system. An example ROP attack utilizes instructions within the process or within system libraries that are linked against a compiled binary of the process.

To perform a ROP attack, an attacker can analyze instructions in address space of process, or in libraries that are linked with the process, to find a sequence of instructions that, if the process were forced to execute, would result in the attacker gaining some degree of unauthorized control over the computing system on which the process executes. Through various attack techniques, such as stack or heap manipulation, forced process crashes, or buffer overflows, the vulnerable process can be forced to execute the sequence of instructions identified by the process. Thus, an attacker can manipulate existing instructions in memory and force a process to perform partially arbitrary operations even if the attacker is no longer able to inject arbitrary code into memory to use when exploiting a vulnerable process.

SUMMARY OF THE DESCRIPTION

A system and method of fine-grained address space layout randomization can be used to mitigate a data processing system's vulnerability to return oriented programming security exploits. In the summary and description to follow, reference to "one embodiment" or "an embodiment" indicates that a particular feature, structure, or characteristic can be included in at least one embodiment of the invention. However, the appearances of the phrase "in one embodiment" in various places in the specification do not necessarily all refer to the same embodiment.

In one embodiment, a non-transitory machine-readable medium stores instructions which, when executed by one or more processors of a computing device, cause the device to perform operations comprising selecting a region in a first address space in memory of the device, the region storing instructions for execution by one or more processors of the device, dividing the region into multiple clumps, each clump including at least a start page and an end page, and mapping each clump to a random address in a second address space.

In one embodiment a data processing system comprises one or more processors coupled to a memory device, a loader to cause the one or more processors to load a segment of a binary into the memory, a first memory manager to map a first virtual memory address to a first physical address in memory, the first address in a region of the memory including the segment, a second memory manager to randomly map a second virtual memory address to the first virtual memory address, and a memory view process to present a view of the segment to a user process, wherein the view includes the second virtual memory address.

In one embodiment an electronic device comprises one or mom processors coupled to a bus. Also coupled to the bus is a memory device to store a shared library cache. A first process stored on the one or more memory devices can execute on the one or more processors to present a shuffled view of a virtual memory region to a second process, the virtual memory region including a library in the shared library cache.

The above summary does not include an exhaustive list of all aspects of the present invention. Other features of the present invention will be apparent from the accompanying drawings. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example. The drawings and associated description are illustrative and are not to be construed as limiting. In the figures of the accompanying drawings in which like references indicate similar elements.

DETAILED DESCRIPTION

Address Space Layout Randomization (ASLR) is one countermeasure against potential system exploits that makes it difficult for an attacker to predict the address of various program segments in memory. One method of implementing ASLR uses base address randomization for one or more segments of a library or application when the library or application is loaded into memory. The base address of the randomized segments can be randomized by a 'slide' value each time the process is loaded into memory. However, sliding the entire segment by a single offset can leave instructions in the segment vulnerable if the slide value of the segment is discovered.

Described herein, in various embodiments, is a system and method of enhanced ASLR, which uses fine-grained address layout randomization to mitigate a data processing system's vulnerability to security exploits. A data processing system can use embodiments of the method to mitigate the system's vulnerability to ROP security exploits. The randomization can occur at the sub-segment level by shuffling 'clumps' of virtual memory pages. Each clump of virtual memory pages (e.g., page clump) includes one or more contiguous virtual memory pages that can be randomly shuffled into a randomized view of virtual memory. The shuffled and randomized virtual memory can be presented to processes executing on the system. The mapping between memory spaces can be obfuscated using several obfuscation techniques to prevent the reverse engineering of the shuffled virtual memory mapping.

Numerous specific details are described to provide a thorough understanding of various embodiments. However, in certain instances, well-known or conventional details are not described in order to provide a concise discussion.

Virtual Memory Overview and Address Space Layout Randomization

Figure 1:
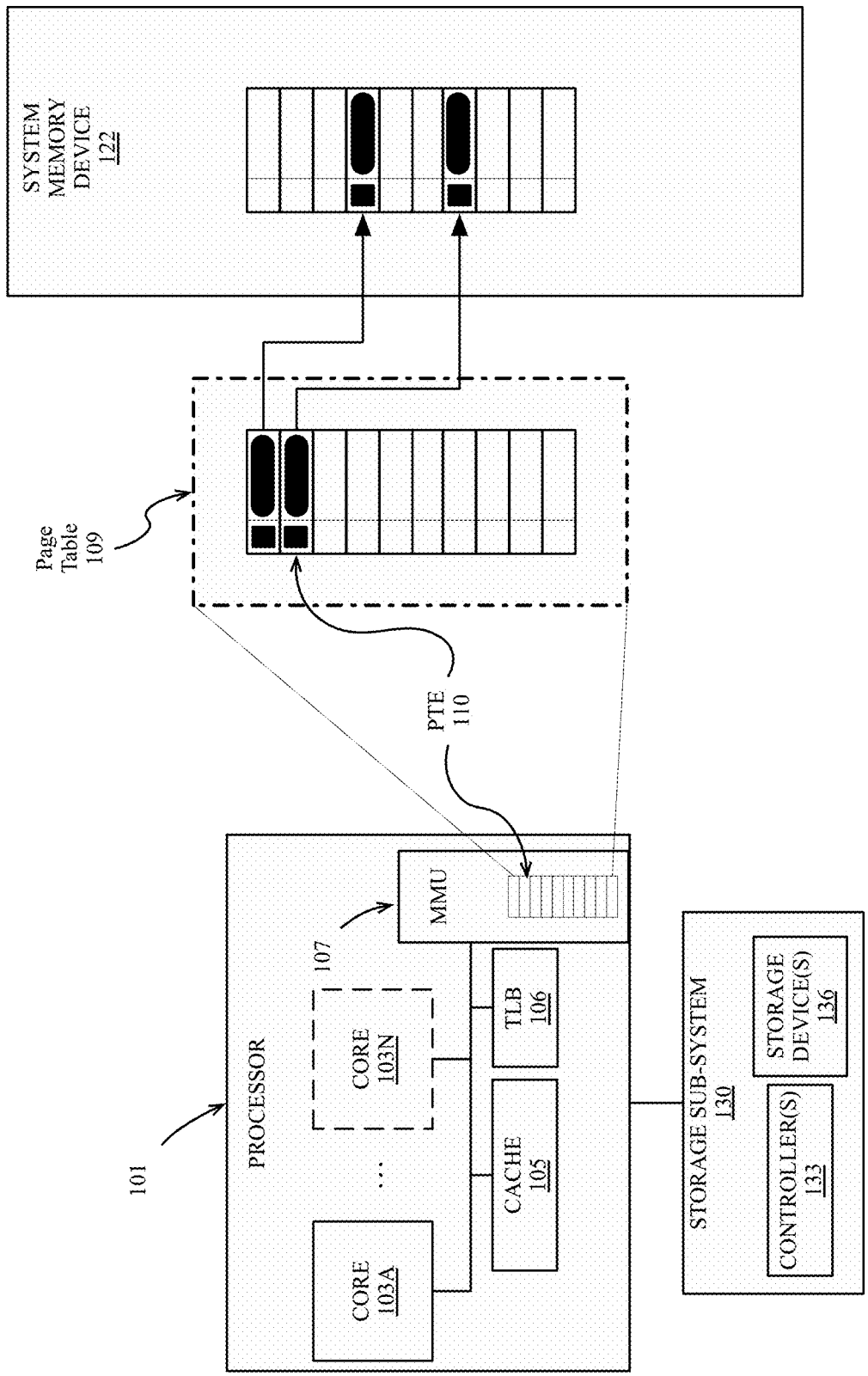
FIG. 1 is an illustration of an exemplary virtual memory system of a computing device.

FIG. 1 is an illustration of an exemplary virtual memory system of a computing device. The exemplary system includes an exemplary processor 101 having one or more cores 103A-N, a cache 105, a memory management unit 107 (MMU), and a translation lookaside buffer (TLB) 106. The system further includes a physical system memory device 122 and a storage sub-system 130 including one or more controllers 133 coupled to one or more storage devices 136. The exemplary virtual memory system can generally be included in a variety of data processing systems, including the data processing system further detailed in FIG. 17 below.

The MMU 107 included in the processor can be configured to accelerate a virtual memory to physical memory address translation in hardware. The MMU 107 can be configured with the address of one or more page tables 109 stored in the physical system memory device 122. Each page table 109 is a data structure that contains multiple page table entries (e.g., PTE 110) containing the physical address of a page of memory. The size of a memory page can vary based on system configuration and processor architecture. Each page table is indexed by the virtual address of the page of memory. Data from the page table 109 can be cached in the TLB 106 to further accelerate address translation.

The MMU 107 uses data in the TLB 106 or in the page table 109 in memory to translate a given input virtual address into an output physical address if a physical memory address exists in the physical system memory device 122 for the given virtual address. A virtual memory address contains several bits, the number of bits corresponding to the size of the virtual address space. A portion of the bits can correspond to a virtual page related to the memory address, and a portion of the bits can correspond to a memory offset within the page, depending on the virtual memory configuration of the system. A 64-bit virtual memory system can use up to 64 bits of address space, allowing over 18 exabytes of addressable space. Thus, the virtual memory system can enable an operating system of a computing device to address significantly more memory than physically included in the system. As available space in the system physical memory device 122 is consumed, virtual memory pages on the memory device 122 that are unused may be back up to the storage subsystem 130. The physical memory pages associated with backed up virtual memory pages can then be re-used. The operating system of the computing device can include one or more 'pagers,' which are used to page virtual memory pages between the system memory device 122 and one or more storage devices 136 of the storage system 130.

The exemplary virtual memory system of FIG. 1 allows each process to view disjoint regions of the system physical memory device 122 as a contiguous virtual memory address space that can differ from the address space presented to other processes concurrently executing on the system. This enables certain software or system development techniques such as loading certain segments of code or data into a fixed or predictable virtual memory addresses when loading binary object files into memory. However, fixed or predictable address loading introduces several security vulnerabilities into the system. In particular, loading object segments into predictable virtual memory addresses allows software exploits that are discovered on one system to be easily distributed to other systems that also used the same or similarly predictable virtual memory address layout. The randomization of at least a portion of the virtual memory address space via ASLR techniques provides a security improvement over fixed virtual memory address loading by making the address location of specific segments difficult to predict.

Figure 2:
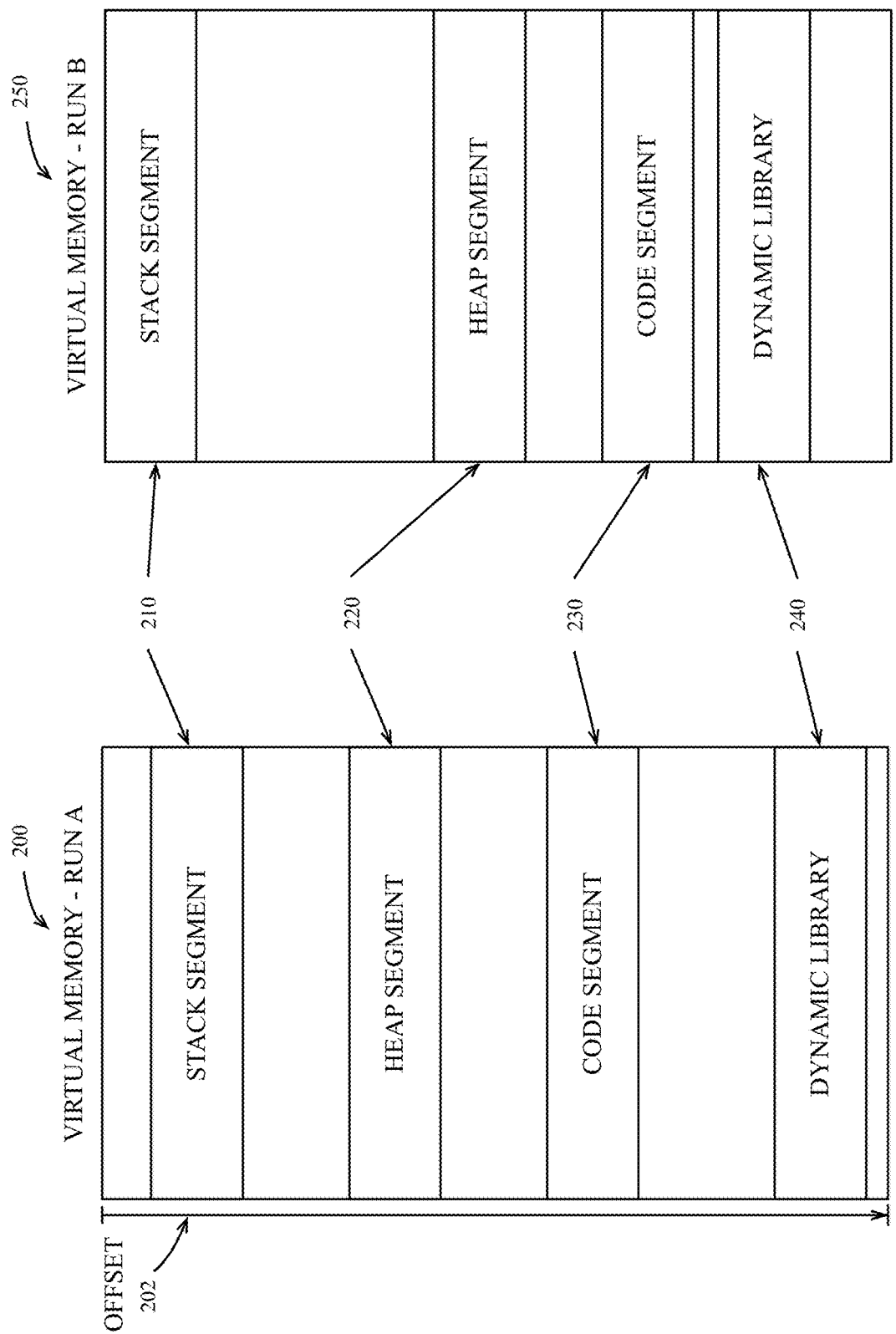
FIG. 2 shows an exemplary implementation of ASLR utilizing segment base address randomization.

FIG. 2 shows an exemplary implementation of ASLR utilizing segment base address randomization. An exemplary virtual memory address space layout of a process is shown during a first run (process memory-run A 200) and a second run (process memory-run B 250). Each address layout includes at least a stack segment 210, a heap segment 220, a code segment 230, and a library segment, such as a dynamic library segment 240 that can be dynamically mapped into process memory space at runtime. Each segment can slide by a random offset 202 from a point in the virtual memory address space each time the object is loaded into memory.

In the case of code segments, varying the location of the segments results in a variation in the location of the various functions of the process or library, which creates an unpredictable attack surface for those attempting to exploit the system. If an attacker is able to develop an attack for a particular address space layout, successive attempts to harness the exploit may be unsuccessful, as the system can dynamically randomize the location of the instructions at load time for each binary, which can frustrate or mitigate the successful distribution of a widespread attack across a variety of computer systems. The randomization can be based on pseudorandom algorithms that can approximate completely random results.

The randomization can occur each time an object is loaded into memory, creating a different address space layout for each successive execution of a program or for each load of a library. In the case of user applications or libraries, the randomization can occur between each run of the application or each time the library is loaded. For kernel objects and system libraries, the randomization can occur between system reboots, although variations in the randomization scheme are possible based on the implementation.

Fine-Grained Address Space Layout Randomization

The exemplary ASLR implementation shown in FIG. 2 slides entire segments in memory at load time, which provides randomization of the address space layout, but may become vulnerable to 'disclosure attacks,' in which a portion of the randomized layout is revealed to an attacker. One possible disclosure attack utilizes analysis of indirect control flow via jump or offset tables (e.g., an import address table (IAT), procedure linkage table (PLT), global offset table (GOT), etc.). If an attacker is able to force the system to disclose the offset of a function or data in the segment, the attacker will be able to apply that offset to access other instructions or data in the segment. To mitigate the vulnerabilities created by disclosure attacks, embodiments of the data processing system described herein implement various forms of fine-grained ASLR, to further randomize instructions and data in memory at a sub-segment level.

Figure 3:
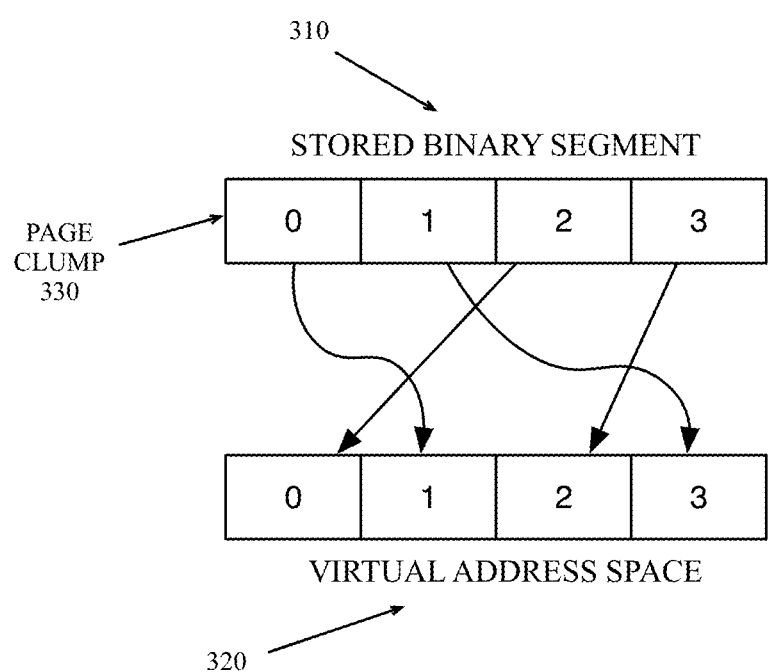
FIG. 3 is a block diagram of fine-grained address space layout randomization, according to an embodiment.

FIG. 3 is a block diagram of fine-grained address space layout randomization, according to an embodiment. An exemplary stored binary segment 310 is shown, which can be any segment in an object binary. The object binary can be a component of any one or more of an application, library, dynamic library, or shared object. Each division (e.g., 0-3) of the stored binary segment 310 represents a page clump 330, which is a group of one or more of the memory pages that make up the stored binary segment 310. The number of pages in a clump and the size of each page can vary according to embodiments.

In one embodiment, a randomizing binary loader is configured to perform fine-grained ASLR when loading the segment into a virtual address space 320, such that each clump (e.g., page clump 330) is loaded to a random address. The loader can shuffle the pages in place, as shown in FIG. 3, or the loader can shuffle the clumps into the virtual address space 320, such that the segment is no longer stored contiguously in virtual memory. A shuffling algorithm can be used to randomize the dispersal of the clumps in memory. In one embodiment, the loader shuffles the clumps by randomly permuting an ordered sequence of between 0 and the total number of clumps, generating a mapping between the linear arrangement of the stored binary segment 310 and the randomized (e.g., shuffled) arrangement of the virtual address space 320. Various shuffling algorithms can be used, such as a Fisher-Yates shuffle (e.g., a Knuth shuffle) or a variant thereof.

The virtual address space 320 can be a dedicated, shuffled virtual address space presented to processes on the data processing system. The system can present the shuffled virtual address space as an address space 'view' to user processes, such as with system libraries shared between processes. The shuffled view can be used to mitigate the usefulness of those shared libraries to ROP based attack and exploitation, which may require the ability to guess the location of certain system calls in memory.

In one embodiment, the shuffled virtual address space can differ from the virtual addressed space used by kernel mode system processes. Multiple instances of the virtual address space 320 can be created and presented to different user processes, such that the view of shared virtual memory presented to a one process can differ from the view of shared virtual memory presented to a different process. In one embodiment, this view differentiation can be performed on a per user basis, or per groups of processes or threads.

Figure 4:
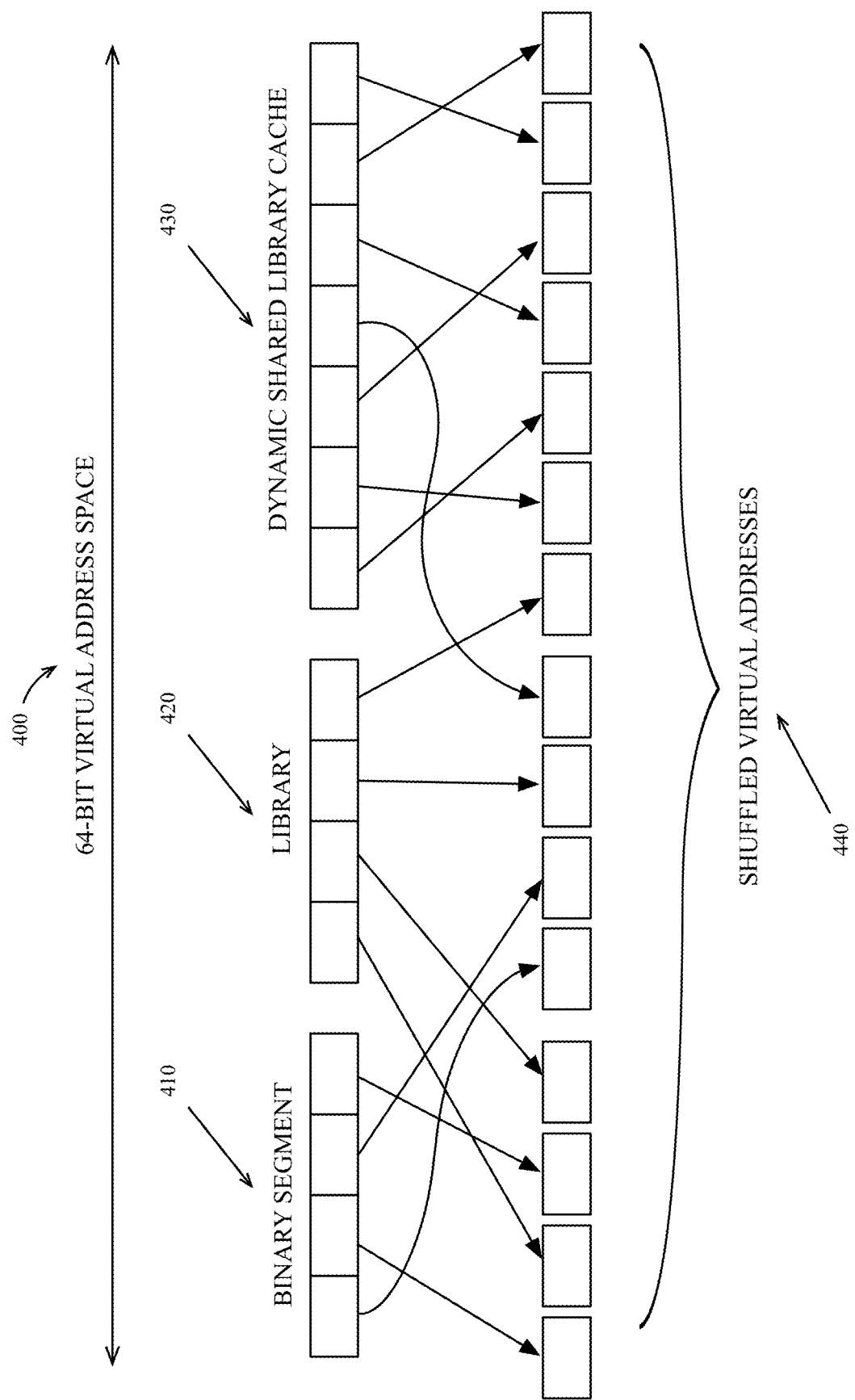
FIG. 4 is an additional block diagram of a fine-grained address space layout randomization, according to an embodiment.

FIG. 4 is an additional block diagram of fine-grained address space layout randomization, according to an embodiment. In one embodiment the fine-grained ASLR can be applied to virtual memory on a region-by-region basis, or to the entirety of the virtual memory address space, which, in one embodiment, is a 64-bit virtual address space 400. A shuffled region of virtual addresses (e.g., shuffled virtual addresses 440) can include one or more binary segments of a process (e.g., binary segment 410) along with any associated libraries (e.g., library 420) and associated virtual addresses of any dynamically linked libraries, such as a library from a dynamic shared library cache 430. In one embodiment, a shuffled view of the virtual addresses of the dynamic shared library cache 430 can be created in place of or in addition to the shuffled view of an application binary 410 or associated libraries 420. In various embodiments, the dynamic shared library cache 430 is a set of multiple, frequently accessed dynamic libraries that are pre-linked and contiguously stored on the data processing system. The entire dynamic shared library cache 430 can be mapped into virtual memory to optimize the dynamic linking process for dynamic shared libraries, reducing the dynamic link time for the libraries stored in the shared cache.

Double Manned Pages for Clump Spanning Functions in Code Segments

When performing ASLR on code segments (e.g., segments containing executable instructions) at the sub-segment level, individual functions within the segment may span the page clumps used to shuffle the segment in memory. In one embodiment, when fine-grained ASLR is enabled the virtual memory addresses of a function that spans a clump boundary may not be contiguously mapped in the virtual memory view presented to the process. The processor can be configured to fetch instructions directly from a process's virtual memory by performing a virtual to physical translation using hardware similar to the virtual memory system of FIG. 1. The processor is generally configured to fetch and execute instructions in a linear manner unless executing a control transfer function (e.g., jump, branch, call, return, etc.). After executing each instruction, the processor fetches and executes the next instruction in virtual memory. Thus, if the next instruction is not located at the next contiguous virtual memory address (e.g., because the remainder of the function is in a page associated with a disjoint clump, the processor will be unable to fetch the proper instruction.

The issue of functions that span clump boundaries (e.g., a clump-spanning function) can be resolved by double mapping pages that include a clump spanning function. In one embodiment, the start page of a clump containing a clump spanning function can be double mapped in the shuffled virtual memory view, having a first mapping at a random address in memory with the other pages of the clump and a second mapping that is contiguous with the clump containing the start of the clump spanning function.

Figure 5A:
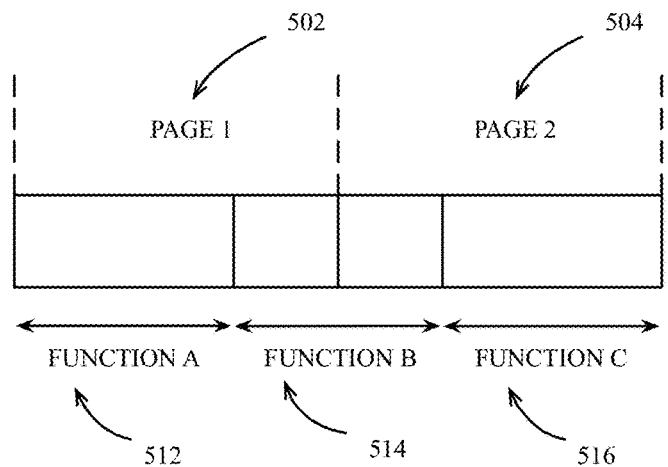
FIG. 5A and FIG. 5B illustrate the issue of clump spanning functions and a double page mapping solution employed in one embodiment.
Figure 5B:
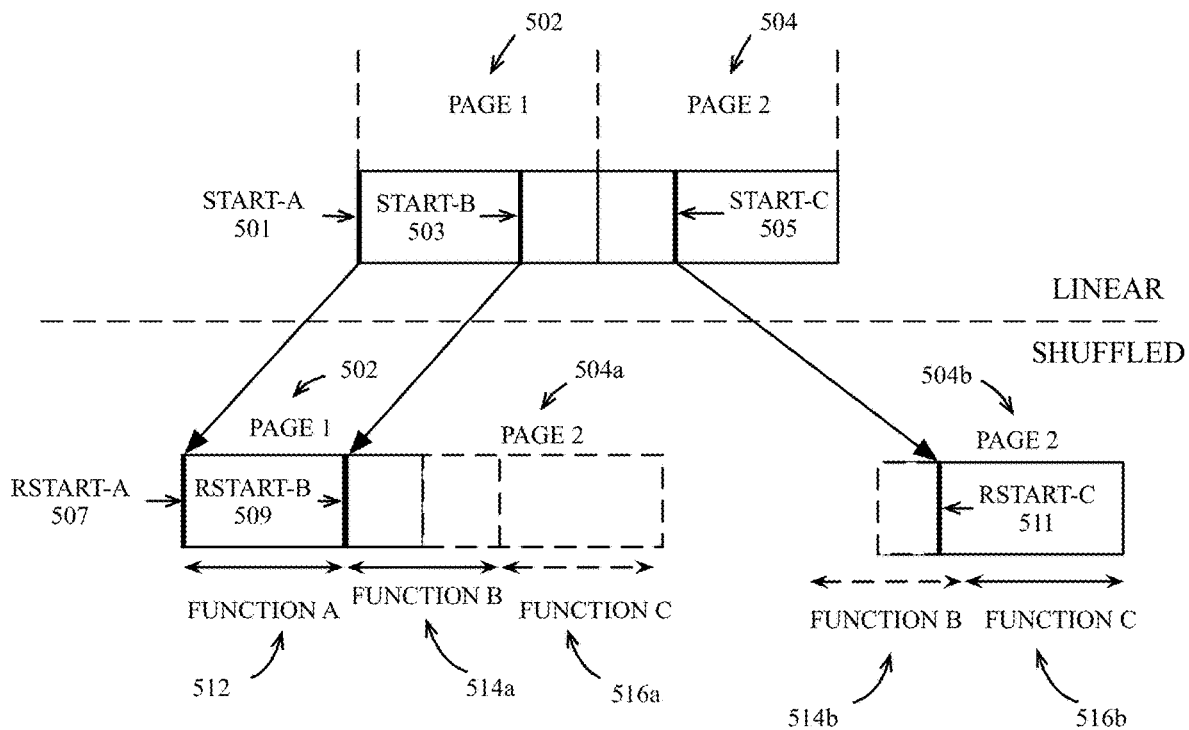

FIG. 5A and FIG. 5B illustrate the issue of clump spanning functions and a double page mapping solution employed in one embodiment. FIG. 5A shows a portion of an exemplary binary segment that is mapped into a linear virtual memory address space. A first page (e.g., page 1) 502 and a second page (e.g., page 2) 502 are shown. The first page 502 represents the end page of a first clump of memory pages, while the second page 504 represents the start page of a second clump of memory pages. In the exemplary segment, the first page 502 includes the entirety of a function (e.g., function A 512) and the second page includes the entirety of a function (e.g., function C 516). However, function B 514 is stored partially in the first page 502 and partially in the second page 504. Accordingly, function B may be split when viewed from a process having a shuffled view of virtual memory, rendering the function unusable by the process.

FIG. 5B shows the functions and pages once they are loaded into shuffled virtual memory of one embodiment, including the double mapping of the second page 504. One instance of the second page (e.g., page 2 504a) is mapped contiguously with the first page 502 at the end of the first clump and a second instance (e.g., page 2 504b) randomly shuffled into memory along with the second clump of pages. This results in a contiguous section of virtual memory containing function B 514a and the remainder portion of function B 514b in an unused portion of the second instance of the second page (e.g., page 2 504b). Likewise, a duplicate version of function C 516a can exist in the shuffled virtual memory, but the duplicate version is not used in the shuffled function map.

In one embodiment, the exemplary segment shown represents a binary segment of a shared library. The shared library can be dynamically linked into a calling process by the shuffle linker, which enables the process to call the various library functions. Although the shuffle linker can enable the process to make function calls into the shuffled library, the actual location of the functions in memory can be hidden from the calling process. To make the functions of the shared library accessible, a dynamic linker can resolve the symbols for the dynamic library using a shuffled clump map, which is generated when the segments of the library are shuffled into the shuffled virtual memory address space. A mapping between the start addresses of the functions (e.g., start-A 501 for Function A 512, start-B 503 for function B 514, and start-C 505 for function C 516) can be generated to allow processes with a shuffled view of the virtual memory to call the shared library function.

In one embodiment, the shuffled (e.g., randomized) start address of each function (e.g., rstart-A 507 for function A 512, rstart-b 509 for function B 514 and rstart-C 511 for function C 516b) can be determined by referencing the clump map generated when the clumps are shuffled into memory. In one embodiment, each randomized start address can be determined by adjusting the start address of a function by the difference between the linear address and the shuffled address of the clump housing the function. For example, the shuffled start address of function A 512 (e.g., rstart-A 507) may be determined by sliding the start-A 501 address by the difference between the addresses of the first clump in linear and shuffled memory.

Figure 6:
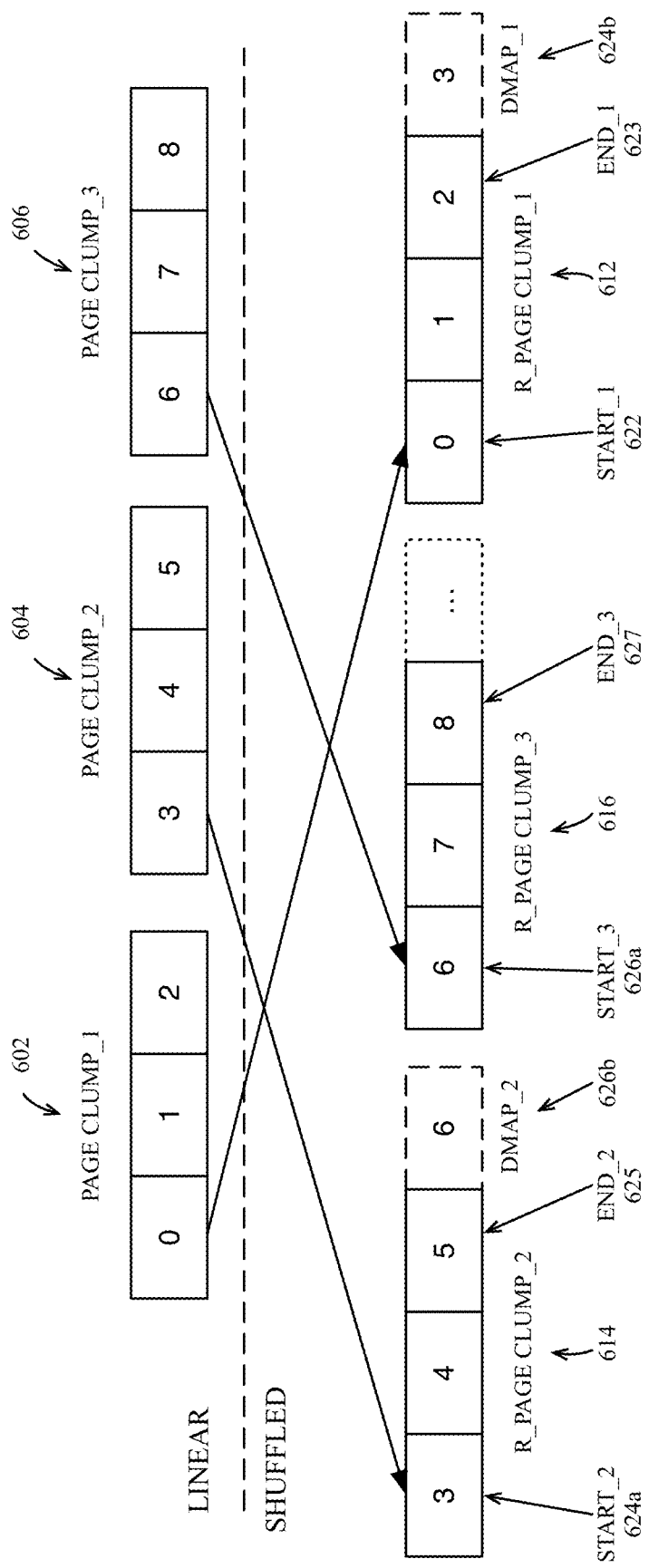
FIG. 6 is a block diagram of an exemplary clump mapping using multi-page clumps.

FIG. 6 is a block diagram of an exemplary clump mapping using multi-page clumps. The page clumps illustrated in linear address space (e.g., page clump_1 602, page clump_2 604, page clump_3 606) represent clumps within a binary segment, which may be within the same binary segment or in different binary segments. A clump size of three pages is illustrated, though the size of each clump can vary according to embodiments. As also shown in FIG. 5B, when the clumps are distributed into the shuffled virtual memory address space, pages containing the remainders of clump-spanning functions can be double mapped in the shuffled virtual memory space. In the exemplary clumps shown, a first function can begin in page 2 of page clump_1 602 and ends in page 3 of page_clump_2 604. An additional function can begin in page 5 of page_clump_2 604 and extend into page 6 of page clump_3 606. Page 8 of page_clump_3 606 may, in some instances, also include the start of a page-spanning function, though not all clumps will include a function that spans pages. For example, in one embodiment the end page of a code segment may not include a page spanning function.

In one embodiment, when the page clumps are loaded into memory, the clumps are shuffled into a randomized view of virtual memory and pages are double mapped. The page clumps can be shuffled into an exemplary randomized and non-contiguous virtual memory address space as shown in FIG. 6 (e.g., r_page_clump_2 614, r_page_clump_3 616, r_page_clump_1 612). Page 3, the start page of r_page_clump_2 614 (e.g., start_2 624a) is double mapped (e.g., dmap_1 624b) contiguously with page 2 (e.g., end_1 623) of r_page_clump_1 612. Page 6, the start page of r_page_clump_3 616 (e.g., start_3 626a) is double mapped (e.g., dmap_2 626b) contiguously with page 5 (e.g., end_2 625) of r_page_clump_2 614. Page 0 (e.g., start_1 622) of r_page_clump_1 1612 may or may not be double mapped depending on the contents of page_clump_1 602. Likewise, an additional page may or may not be double mapped contiguously with page 8 (e.g., end_3 627) in r_page_clump_3 616, based on whether page 8 includes any functions that extend beyond the end of page_clump_3 606. The double mapping does not increase the amount of physical memory consumed by the device, as the double mapped pages consume only virtual memory addresses, which are numerous in the 64-bit virtual memory address space employed by embodiments described herein.

Exemplary Processing Logic for Fine-Grained ASLR

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 7:
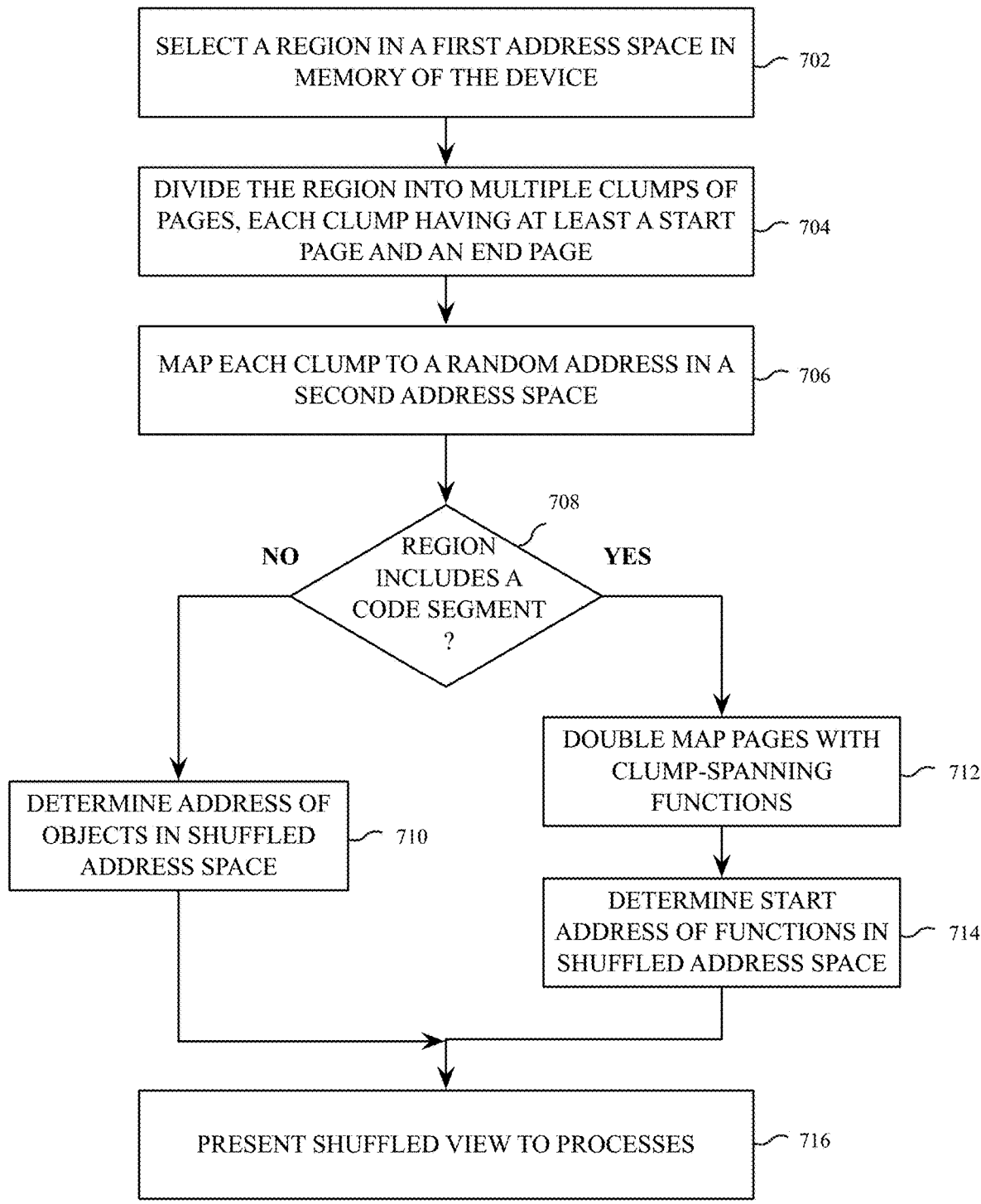
FIG. 7 is a flow diagram of logic to configure a data processing system to perform fine-grained ASLR, according to an embodiment.

FIG. 7 is a flow diagram of logic to configure a data processing system to perform fine-grained ASLR, according to an embodiment. In one embodiment, the system selects a region in a first address space in memory of the device, as shown at block 702. The region can be the virtual address range of a binary segment in an object file, such as a stored binary object of an application or library. The segment can be a code segment, a data segment, or any segment containing information for which the address space is to be randomized or shuffled. In one embodiment the region can include one or more of an object binary load address, a library load address (e.g., a static library), a dynamic library cache, or a shared object cache. In one embodiment, the selected region encompasses a shared library cache (e.g., dynamic shared library cache 430 of FIG. 4). The first address space can be a linear, 64-bit virtual memory address space based on the virtual address space of an operating system kernel virtual memory manager.

As shown at block 704, the system can divide the region into multiple clumps of pages, each clump having at least a start page and an end page. In one embodiment, clumps generally include multiple pages, such as the exemplary three-page clumps shown in FIG. 6. However, a clump can also include a single page, such that mapping references to the start and end page of the clump point to the same page. In one embodiment the size of the clump can vary within a region. In one embodiment, dividing the region into multiple clumps includes a process to determine, within a page of the memory, an offset to split the page, as further described in FIG. 8 and FIG. 9, which are block diagrams illustrating exemplary methods of dividing a region of virtual memory into multiple clumps of pages.

As shown at block 706, the system can then map each of the clumps into a random address in a second address space. In one embodiment the second address space is used to present a randomized view of the selected region of virtual memory to user mode processes executing on the system. Each process may have a separate shuffled view of the region of virtual memory. In one embodiment, system wide view is created by a memory manager at system startup and presented to all other processes executing on the system.

The system can alter the logic flow based on the contents of the region, as shown at block 708 in which the system determines whether the region includes a code segment containing instructions. If only data is shuffled, the system can proceed to block 710 to determine the address of data objects in shuffled address space. In one embodiment, a high-level or front-end compiler provides information about the location and boundaries of each object within the segments located within the linear address space associated with the region. The mapping to objects in shuffled memory can then be determined based on the clump mapping. The map of shuffled data objects can be used at system runtime (e.g., by a dynamic linker) to resolve indirect references to data in shuffled memory.

If at block 708 it is determined that a region includes one or more code segments containing instructions, the system can proceed to block 712 to double map any pages including the remainder portion of a clump-spanning function. Using ASLR on code segments can be of particular importance in mitigating ROP based attacks, which may rely on the re-use of system libraries that are linked with a user process. However, as illustrated in FIGS. 5A-B and FIG. 6, fine-grained ASLR at the sub-segment level may result in one or more functions that span clump boundaries. For code segments, as shown at block 714, the system can also determine the start addresses of functions in the shuffled address space. In one embodiment, the compiler provides information regarding the location and boundaries of each function in the code segments. The start addresses of the functions can be used to build a masked function table to enable calls into shuffled memory, allowing indirect calls into shuffled memory without disclosing the actual virtual address in which the target functions reside.

As shown at block 716, the system can then present the newly created shuffled view to processes on the system. In one embodiment, a memory manager process creates shuffled view at system startup and presents the shuffled view to all other processes on the system. The memory manager process can be process ID 1 (PID 1), the first process spawned by the operating system. In one embodiment, alternate or additional views can be created, such as a view for all user mode processes, for each user mode process, or a view dedicated to one or more groups of shared system libraries, such as a shared library cache.

Figure 8:
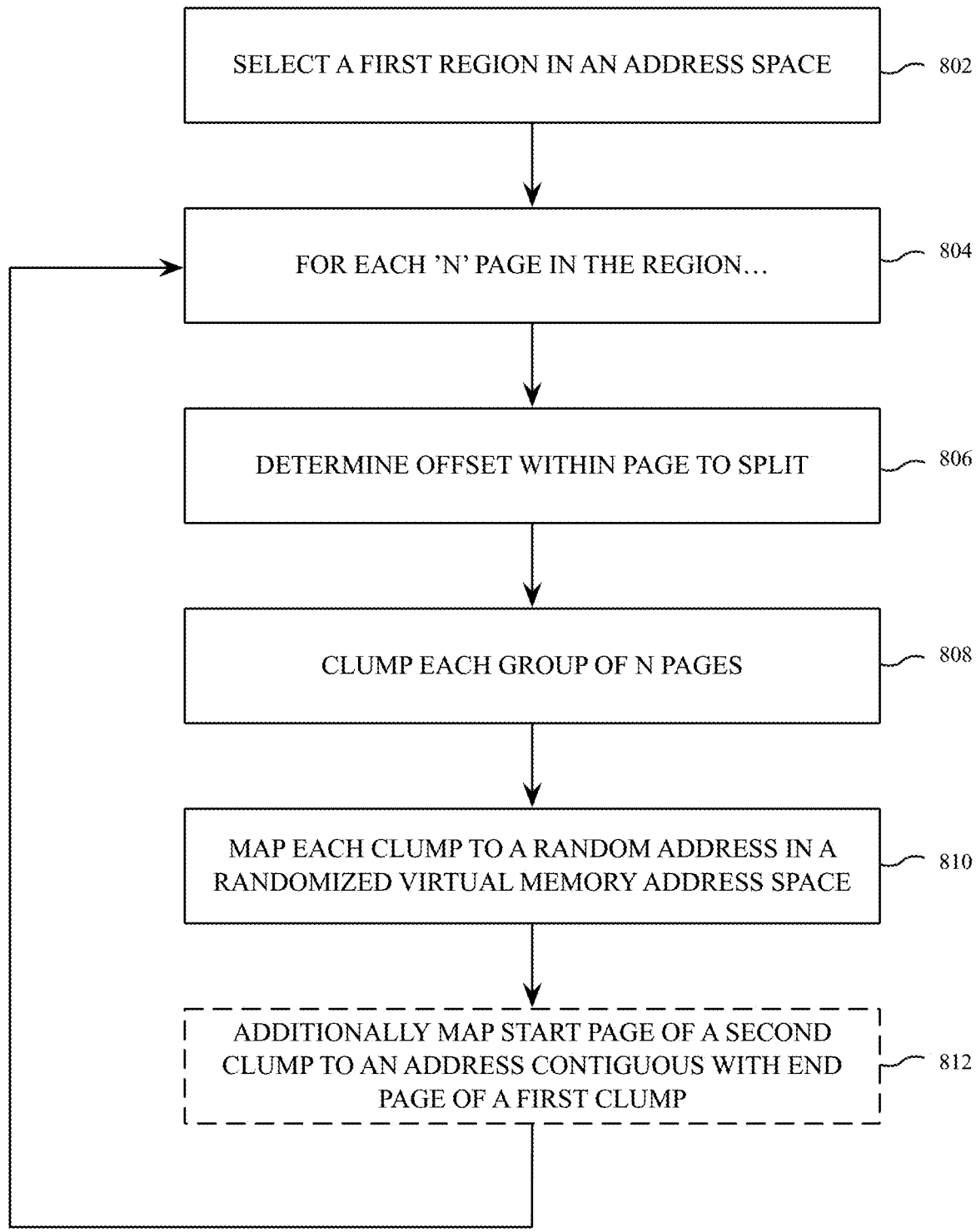
FIG. 8 is a block diagram illustrating a method of dividing a region of virtual memory into multiple clumps of pages, according to an embodiment.

FIG. 8 is a block diagram illustrating a method of dividing a region of virtual memory into multiple clumps of pages, according to an embodiment. The system can select a first region in an address space, as shown at block 802. In one embodiment, the address space can be the linear virtual memory address space visible to a shuffle virtual memory manager on the device. The system partitions the region into clumps of 'N' pages each, where N is the size of the clump in pages. N can be one or more pages, based on the system configuration or the selected region. N may be a fixed number of pages per region or can vary within a region. The sizes of the pages within a region can also vary based on the data set or memory manager configuration and is not fixed to the page size of the system architecture.

As shown at block 804, for each N page in memory, the system performs a set of operations beginning with block 806. At block 806, the system can determine an offset within the page to split the page. The page split determines which portion of the page will be grouped with which clump and determines which pages will be double mapped. In one embodiment, only every N page may be split, which may define the start page and/or end page of the clump, according to an embodiment. As shown at block 808, each group of N pages can be grouped as a clump and, as shown at block 810, the system can map each clump into a random address in a randomized virtual memory address space which, in one embodiment, is the shuffled view presented to processes on the system.

In one embodiment, where the region includes one or more code segments including functions that span a clump boundary, the system can additionally map the start page of the second clump of the clump-spanning function to an address that is contiguous with the end page of the first clump where the start address of the clump-spanning function resides, as shown at block 812. In one embodiment the offset to split the page, as determined at block 806, is used at least in part to determine the start address of a function within a clump after the clumps are mapped into the shuffled address space, as in block 810. For example, and with reference to FIG. 5A, an embodiment can split page 2 504 in linear virtual memory at an offset defined by the end of function B 514. Accordingly, as shown in FIG. 5B, function C 516 becomes the first function start address (e.g., rstart-C 511) of shuffled page 2 504*b*.

Loading and Linking Binary Objects Using Fine-Grained ASLR

Aspects of the fine-grained ASLR described herein can be implemented in part during the linking and loading process of a binary object file. Object segments can be loaded into memory in a randomized manner by an object loader configured to perform fine-grained ASLR by shuffling clumps of pages containing the segment. Additionally, the load addresses of functions in memory can be obfuscated using one or more obfuscation techniques to prevent the reverse engineering of the mapping between page clumps in linear virtual memory and the clumps in a shuffled view of virtual memory.

Figure 9:
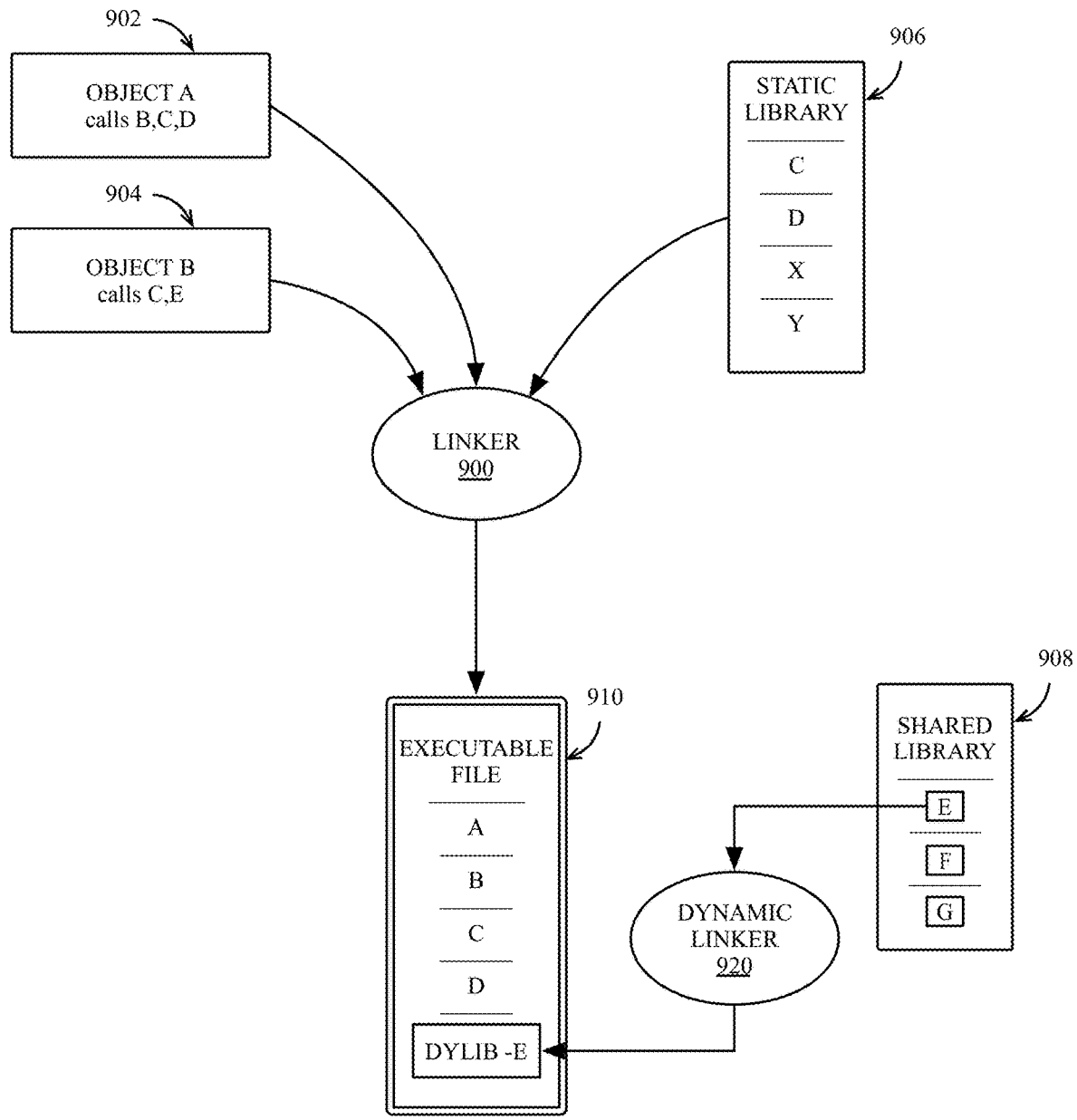
FIG. 9 is a block diagram illustrating a linking and loading process, according to an embodiment.

FIG. 9 is a block diagram illustrating a linking and loading process, according to an embodiment. In one embodiment, the linker 900 generates an executable file 910 to run on a data processing system by combining binary object files (e.g., object A 902, object B 904) and any statically linked libraries (e.g., static library 906). At a later point, such as when the executable file is loaded for execution, or dynamically during runtime, a dynamic linker 920 can perform operations to replace the dynamic library stubs that are included in the executable file 910 with a reference by which the executable file 910 may indirectly call functions in the dynamic shared library 908.

For example, object A 902 and object B 904 are compiled object files that are the output of a compiler process, which converts high-level instructions into binary data that can be executed by the data processing system. Object A 902 includes function calls to function B stored in object B 904, as well as calls to functions C and D, which are stored in a static library 906. Object B 904 includes calls to function C in the static library 906 and a call to function E in the shared library 908. The linker 900 can resolve symbolic references to functions within object A 902, Object B 904 and the static library 906 at initial link time to create the executable file 910. However, the reference to function E is a stub reference that can be resolved at run time by the dynamic linker 920 to enable an indirect call to function E in the shared library 908.

In one embodiment, the indirect call mechanism for dynamic libraries can be configured to enable function calls into shared libraries in a shuffled view of virtual memory while mitigating an attacker's ability to discover the location of the shared functions. In one embodiment, the mapping to shuffled function is protected behind a system call. The linker 900 can configure the object file to interface with the dynamic linker 920, which can make a system call at runtime to retrieve the address of function E in shuffled memory.

Figure 10:
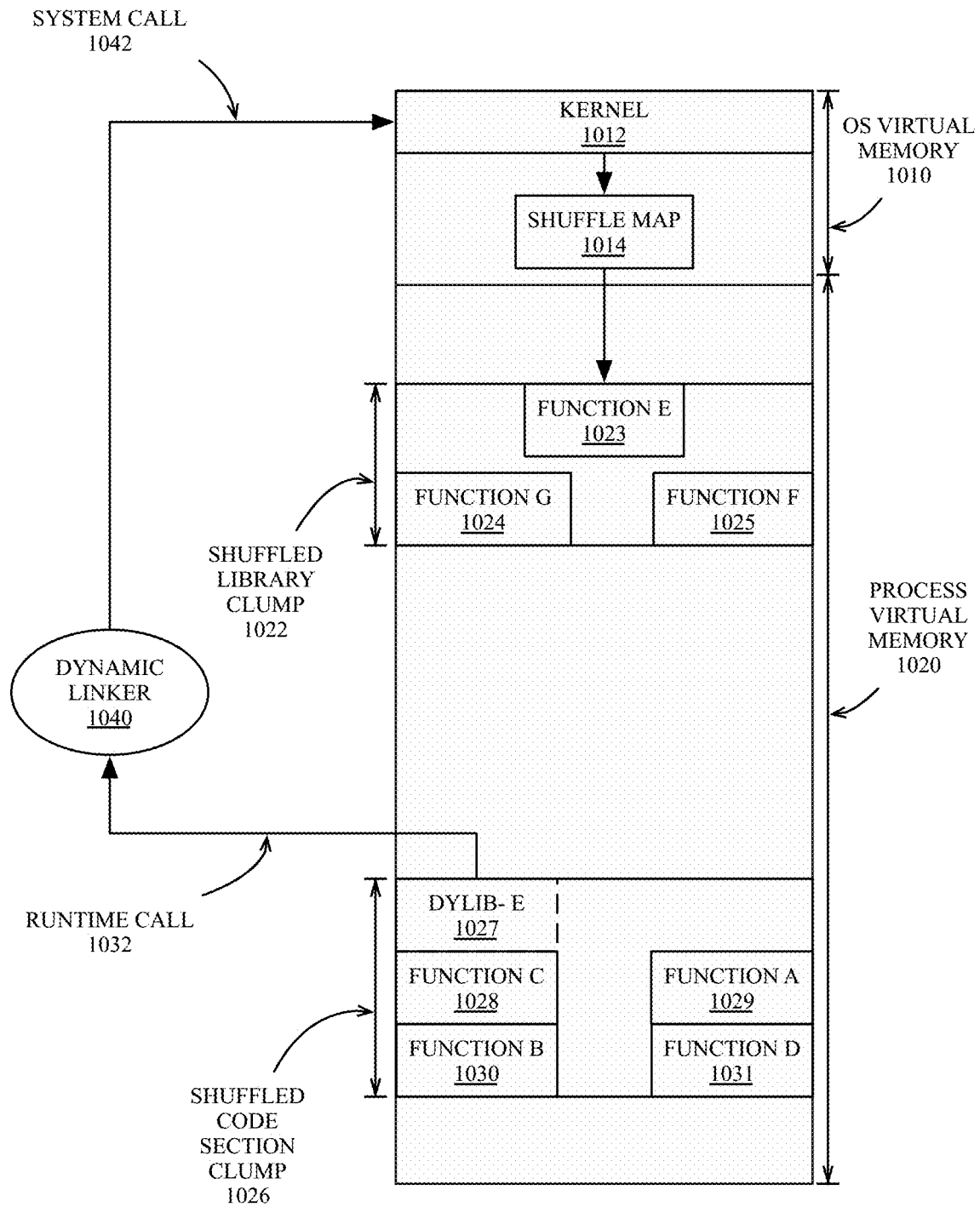
FIG. 10 is a block diagram of a call to a function in a dynamic library that resides in shuffled memory, according to an embodiment.

FIG. 10 is a block diagram of a call to a function in a dynamic library that resides in shuffled memory, according to an embodiment. A runtime view of a virtual memory address space is shown. A region of virtual memory can be dedicated OS virtual memory 1010, which is not directly accessible from process virtual memory 1020. A set of shared library functions can also be shuffled into one or more shuffled shared library clumps (e.g., shuffled library clump 1022) by a binary object loader configured for fine-grained ASLR. The shuffled library section clump 1022 can include one or more shared library functions (e.g., function G 1024, function E 1023, and function F 1025).

In one embodiment, the binary loader can also load the code section of an application into one or more shuffled code section clumps (e.g., shuffled code section clump 1026). The shuffled code section clump 1026 shown includes function C 1028, function A 1029, function B 1030, and function D 1031, which are stored in a shuffled and non-contiguous manner. The shuffled code section clump 1026 can also include a dynamic library reference (e.g., dylib-E 1027) that can be placed in the code segment to replace a stub reference to a dynamic library function. In one embodiment, access to a shuffled shared library function can be facilitated via the dynamic linker 1040. A process can request access to a shared library function (e.g., function E 1023) via a runtime call 1032 to the dynamic linker 920, which can perform a system call 1042 to the operating system kernel 1012 in OS virtual memory 1010. A shuffle map 1014 storing the shuffle address translations can be stored in a location in OS virtual memory 1010 that is inaccessible to process virtual memory 1020. The kernel 1012 can then facilitate an indirect call into the shuffled library clump 1022 to access the shared library function 1023 without exposing the location of the function.

Indirect Function Call Obfuscation via JIT Compilation

In one embodiment, the system is configured to obfuscate indirect calls to shared libraries by replacing indirect call with a set of just-in-time (JIT) compiled instructions that programmatically derive the address of a shuffled function in memory. As an alternative to maintaining a jump table that is filled with shared library function addresses, indirect calls to shared library functions can be routed through a set of instructions that are dynamically compiled just-in-time for execution. JIT compiling the instructions allows the system to reduce the attack surface presented to attackers. In one embodiment the JIT compiled instruction can be dynamically re-compiled, re-randomized, re-located or otherwise dynamically obfuscated to mitigate the threat of reverse engineering.

The JIT compiled instructions can algorithmically derive the function addresses at run time using an inverse of the shuffle algorithm used to compute the initial shuffle map, allowing access to shared library functions in the shuffled address space without directly exposing the address of the functions. In one embodiment, the shuffle algorithm uses a pseudorandom number generator unit to facilitate random number generation. The inverse shuffle algorithm can reproduce the random mapping by re-generating the mapping using the same seed state used to generate the original mapping, allowing the inverse shuffle algorithm to generate a de-shuffle mapping for indirect function calls.

Figure 11:
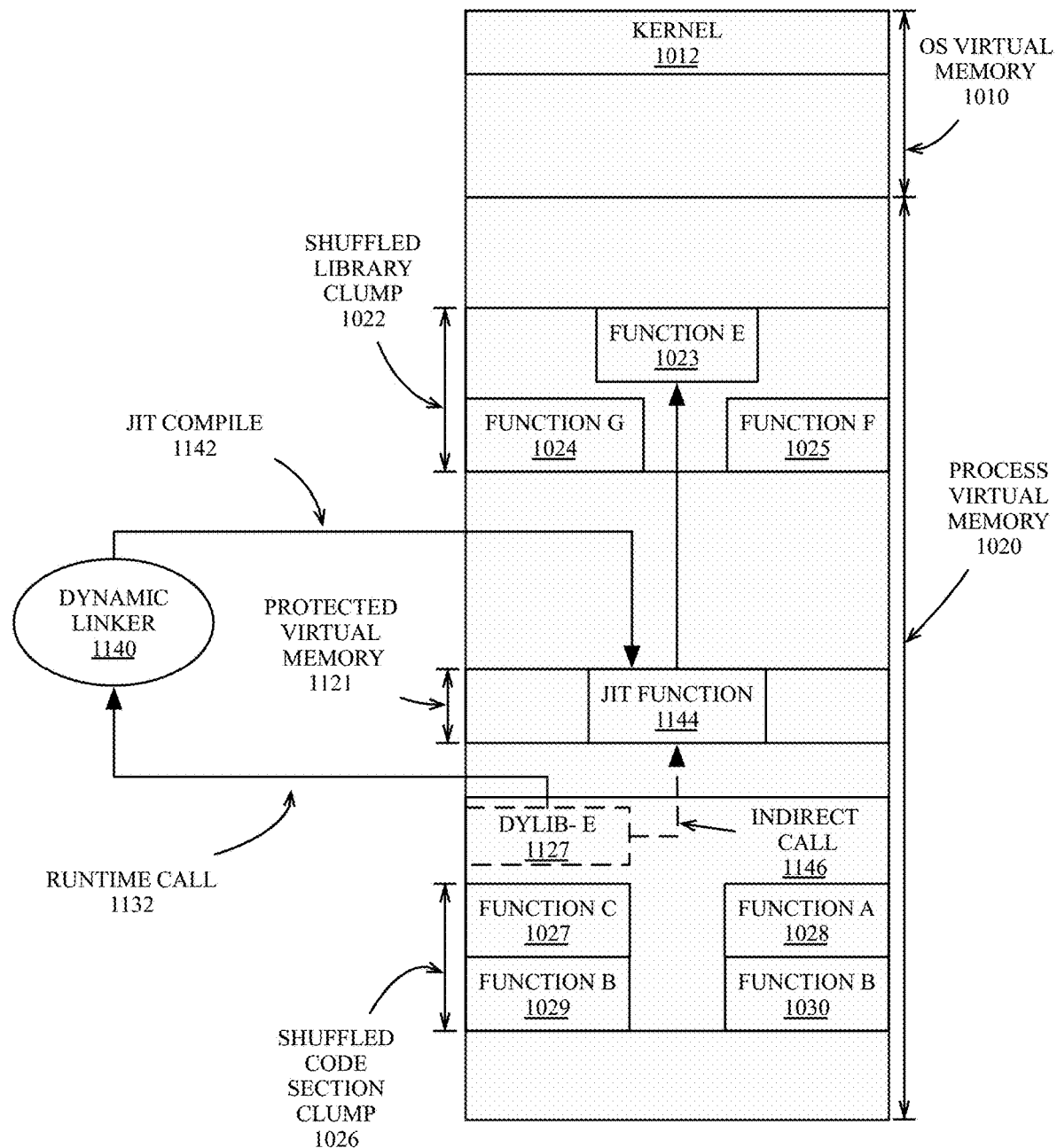
FIG. 11 is a block diagram of indirect access to functions in shuffled virtual memory using a JIT compiled function 1144, according to an embodiment.

FIG. 11 is a block diagram of indirect access to functions in shuffled virtual memory using a JIT compiled function 1144 according to an embodiment. In one embodiment, in response to a request to resolve a symbol for a shared library, the dynamic linker 1140 can allocate a region of protected virtual memory 1121 in process virtual memory 1020. The dynamic linker 1140 can then load a set of instructions in the protected virtual memory 1121 and cause those instructions to be dynamically compiled just-in-time for execution. The JIT compiled function can then algorithmically derive a function address and return a pointer to the function in the shuffled library clump 1022. In one embodiment, the dynamic linker 1140 can then configure an indirect call 1146 to a shared library function via the compiled JIT function 1144, such that instructions in the shuffled code section clump 1026 can make calls to shared library functions in the shuffled library clump 1022 without direct knowledge of the shuffled function start address.

Various virtual memory protections can be applied to the protected virtual memory 1221. In one embodiment the protected virtual memory 1121 is allocated at a random address in process virtual memory 1020. In one embodiment, protected virtual memory 1121 is configured to prevent read access by user processes while allowing instruction fetches by the processor.

In one embodiment, the JIT compiled function includes one or more instructions stored in an intermediate representation. The intermediate representation may be further processed into an architecture independent bitcode. At runtime, the bitcode can be compiled into a machine language for execution by the processor.

Exemplary Processing Logic for ASLR Map Obfuscation

Figure 12:
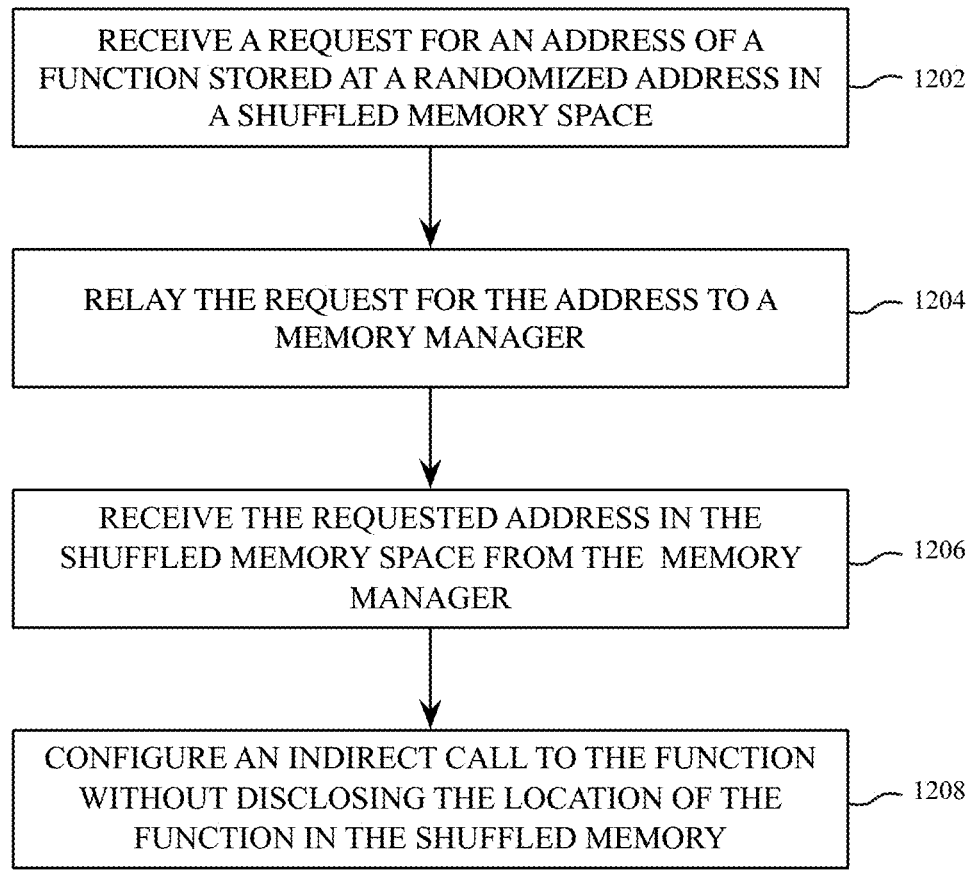
FIG. 12 is a flow diagram of processing logic for ASLR map obfuscation, according to an embodiment.

FIG. 12 is a flow diagram of processing logic for ASLR map obfuscation, according to an embodiment. In one embodiment, a dynamic loader configured for fine-grained ASLR can receive a request for an address of a function at a randomized address in a shuffled memory space, as shown at block 1202. The request can be associated with a command to dynamically load and/or dynamically link with a library that is to be loaded, or has been loaded into a shuffled memory region. The library can also be a shared library in a shared library cache that has been previously loaded and pre-linked by the data-processing system.

In one embodiment, the loader can relay the request for the address to a memory manager configured for fine-grained ASLR, as shown at block 1204. The memory manager can be a component of a virtual memory manager of the data processing system. The memory manager can include a virtual memory pager responsible for paging virtual memory objects into shuffled virtual memory. The memory manager can reside in the OS kernel of the data processing system, as in FIG. 10, or a component of the memory manager can be included in a set of instructions that are JIT compiled in a protected virtual memory region of process virtual memory, as in FIG. 11.

In one embodiment, the loader receives the requested address in the shuffled memory space from the memory manager, as shown at block 1206. In one embodiment, the dynamic loader can configure an indirect call to the function to enable the requesting process to perform function calls to the requested function without disclosing the location of the function in shuffled memory, as shown at block 1208. The indirect call can be to a system call which then relays the call in to the requested function. The indirect call can also be to a JIT compiled function that algorithmically derives the shuffled start address of the requesting function.

Figure 13:
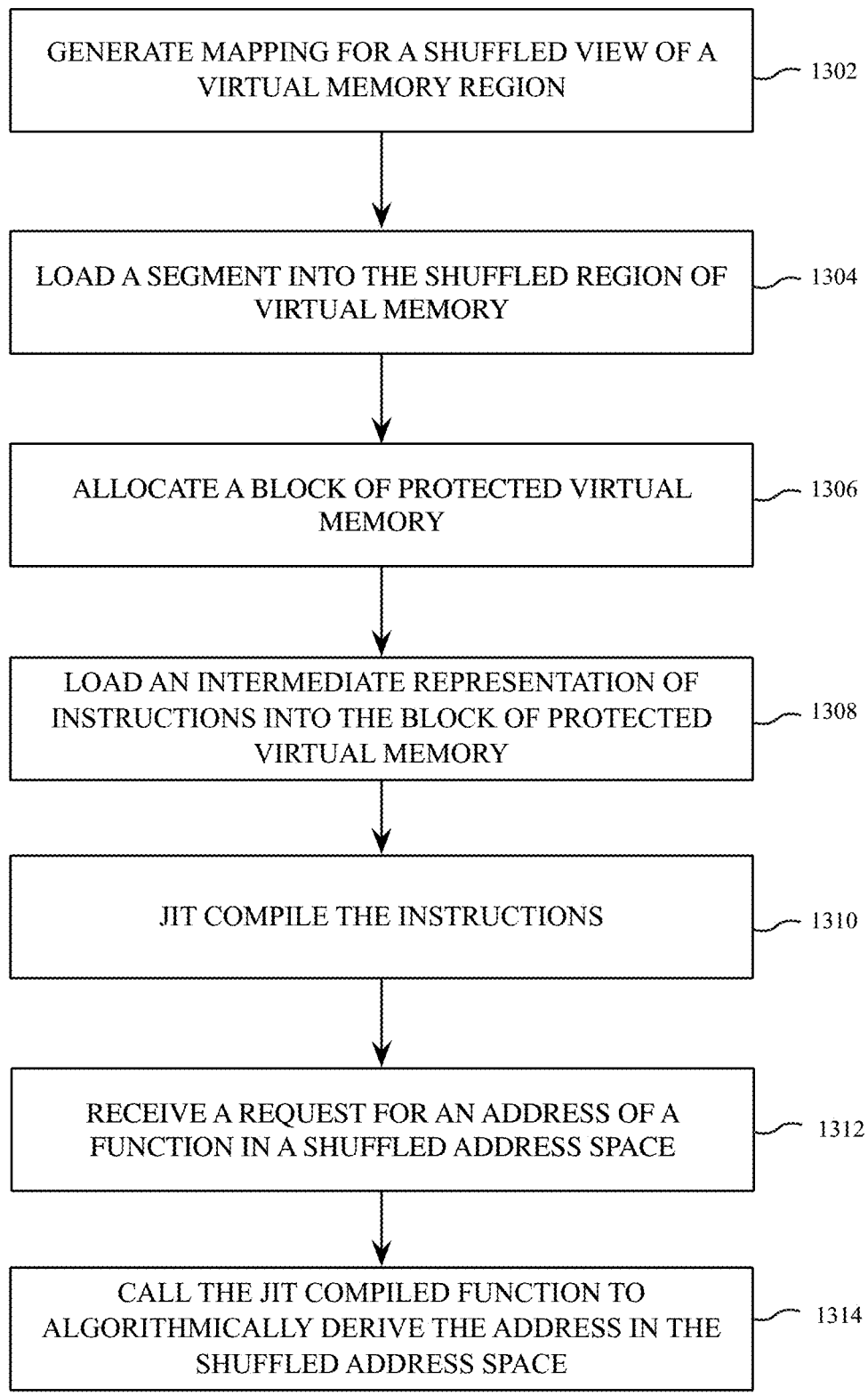
FIG. 13 is a flow diagram of logic to retrieve the address of a function in shuffled memory using a JIT compiled function, according to an embodiment.

FIG. 13 is a flow diagram of logic to retrieve the address of a function in shuffled memory using a JIT compiled function, according to an embodiment. In one embodiment, as shown at block 1302, a memory manager of the system generates a mapping between a linear virtual memory region and a shuffled view of a virtual memory region that is presented to a process. This can occur during process load time, in which a segment of a process is loaded into the shuffled region of virtual memory, as shown at block 1304. In one embodiment, during load time the memory manager also allocates a block of protected virtual memory, as shown at block 1306. The protected virtual memory region can be in the memory space of the process associated with the loaded segment and can be protected via a number of virtual memory protections as described herein.

In one embodiment a system module, such as a dynamic linker/loader module can load an intermediate representation of instructions into the block of protected virtual memory, as shown at block 1310. The intermediate representation can be an intermediate language output by a high level compiler. Alternatively, the intermediate representation can be further pre-assembled by an intermediate assembler into bitcode before being stored for later use. As shown at block 1308, the module can then JIT compile the intermediate language or bitcode into a machine language function for execution. The JIT compiled function includes instructions to perform address translation to determine the address of a function in the shuffled virtual memory region. Accordingly, the function can be used as a relay for an indirect call into the function in shuffled memory each time a process is to access the function. In one embodiment, the JIT compiled function is configured to algorithmically derive the address of the function in the shuffled address space instead of performing a function table lookup or an indirect jump into a jump table. For example, as shown at block 1312, the system module can, during runtime, receive a request for an address of a function in the shuffled address space. The module can then call the JIT compiled function to algorithmically derive the address of the function in shuffled memory, as shown at block 1314.

Figure 14:
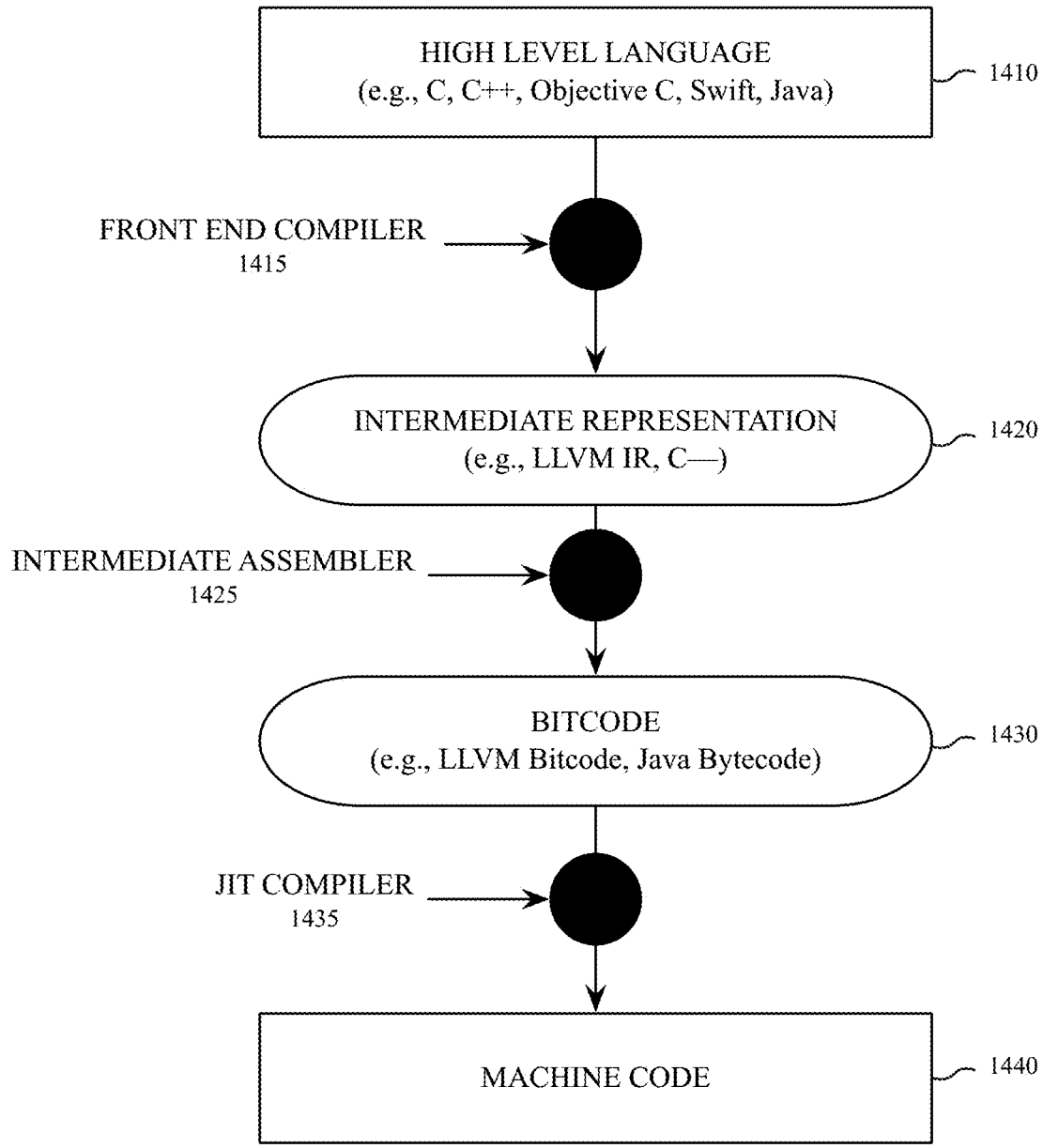
FIG. 14 is a block diagram of a process for pre-compiling instructions in preparation for JIT compilation.

FIG. 14 is a block diagram of a process for pre-compiling instructions in preparation for JIT compilation. In one embodiment, a function 1410 developed in a high-level language (e.g., C, C++, Objective C, Swift, Java, etc.) can be compiled by a compilation system that generates bitcode 1410 for subsequent compilation by a JIT compiler 1435. The high level language 1410 can be processed by a front-end compiler 1415 that converts the high level language 1410 into an intermediate representation 1420. The intermediate representation can be any intermediate representation for high level languages generated by any of any modular compilation system, such as the LLVM intermediate representation, or C--. The intermediate representation 1420 can be further processed by an intermediate assembler 1425 and converted into bitcode 1430.

In one embodiment, the bitcode 1430 (e.g., LLVM Bitcode, Java Bytecode) can be stored by the data processing system for later use. The bitcode 1430 is an architecture independent, low-level representation of the high level instructions that can be quickly convened into machine language for a variety of processing hardware. During runtime, the bitcode 1430 can be provided to a JIT compiler 1435 for conversion into machine code 1440 for execution by a processor or processing system.

Exemplary Data Processing System Architecture

Figure 15:
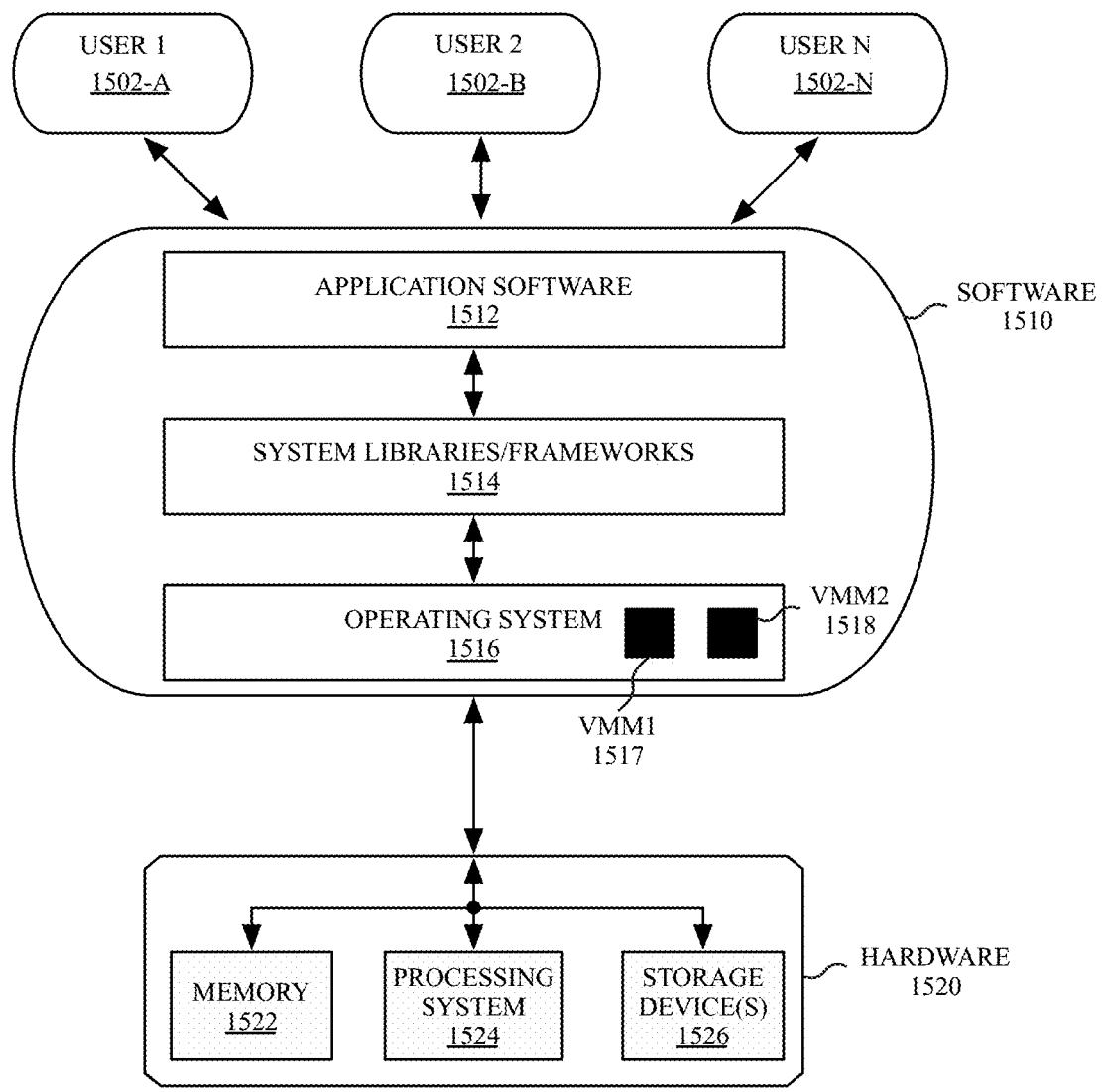
FIG. 15 is a block diagram of system software architecture for a multi-user data processing system, according to an embodiment.

FIG. 15 is a block diagram of system software architecture for a multi-user data processing system, according to an embodiment. The data processing system includes various software 1510 and hardware 1520 components configured to support multi-user data processing for 1 to N user accounts (e.g., User 1 1502-A, User 2 1502-B, User N 1502-N). Processes associated with each user account can access application software 1512 through a user interface provided by an operating system (OS) 1516. The hardware 1520 of the data processing system can include one or more memory devices 1522, a processing system 1524 including one or more processors, and one or more storage devices 1526.

The hardware 1520 can be configured with components to provide a virtual memory system, such as the virtual memory system shown in FIG. 1. The virtual memory system can be managed by multiple virtual memory managers (e.g., VMM1 1517, VMM2 1518), which can provide memory management services, such as virtual memory mapping and paging. The operating system 1516 can configure the memory managers 1517, 1518 to map addresses on the storage devices 1526 into memory, for example, to load binary objects for application software 1512 or system libraries or frameworks 1514. The memory managers 1517, 1518 can also be configured with an embodiment of fine-grained ASLR described herein to provide a system wide shuffled view of virtual memory space. The memory 1517, 1518 managers can be configured to provide a system wide shuffled view of virtual memory space or can be configured to provide a separate shuffled view of virtual memory for each application.

For example, a first memory manager (e.g., VMM1 1517) can be configured to manage a default virtual memory space, which can be a linear mapping of virtual memory visible to the operating system 1516, and a second memory manager (e.g., VMM2 1518) can be configured to provide a shuffled mapping of virtual memory to processes executing on the system. The operating system 1516, via a third memory manager or a dynamic linker (e.g., dynamic linker 920, 1040, 1140, of FIGS. 9-11) can be configured to manage inverse mapping and linking between objects in a linear and shuffled view of virtual memory, or between multiple shuffled views of virtual memory.

Figure 16:
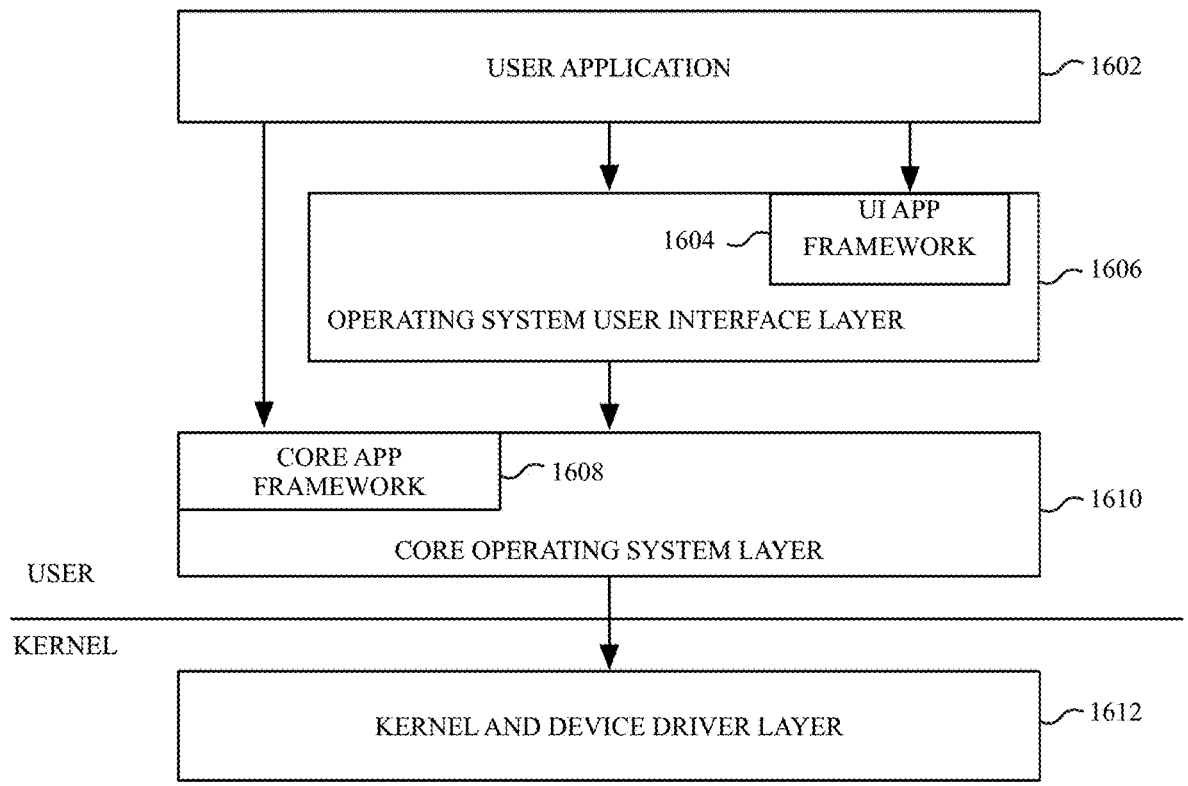
FIG. 16 shows multiple layers of software used by a data processing system, according to an embodiment.

FIG. 16 shows multiple layers of software used by a data processing system, according to an embodiment. The software components are illustrated with a division between user space and a kernel space. Although other arrangements are possible, user applications (e.g., user application 1602), and some operating system components (e.g., operating system user interface layer 1606, and the core operating system layer 1610) execute in user space. In kernel space, the operating system kernel and a set of device drivers operate in the kernel and device driver layer 1612. The kernel and device driver layer 1612 manage the underlying functionality of the overall operating system and provide a formalized and secure mechanism for user space software to access data processing system hardware.

A user interface (UI) application framework 1604 provides a mechanism for the user application 1602 to access UI services provided by the operating system (OS) UI layer 1606. Underlying operating system functions that are not related to the user interface are performed in the core operating system layer 1610. One or more data management frameworks, such as a core app framework 1608 can be made available to a user application to facilitate access to operating system functions.

The exemplary user application 1602 may be any one of a plurality of user applications, such as a web browser, a document viewer, a picture viewer, a movie player, a word processing or text editing application, an email application, or other applications known in the art. The user application 1602 accesses instructions in an exemplary UI app framework 1604 for creating and drawing graphical user interface objects such as icons, buttons, windows, dialogs, controls, menus, and other user interface elements. The UI application framework 1604 also provides additional functionality including menu management, window management, and document management, as well as file open and save dialogs, drag-and-drop, and copy-and-paste handling.

The core operating system layer 1610 contains operating system components that implement features including and related to application security, system configuration, graphics and media hardware acceleration, and directory services. Multiple application frameworks, including the core app framework 1608, provide a set of APIs to enable a user application 1602 to access core services that are essential to the application, but are not directly related to the user interface of the application. The core app framework 1608 can facilitate an application access to database services, credential and security services, backup services, data synchronization services, and other underlying functionality that may be useful to an application.

The core app framework 1608, or equivalent application frameworks, can provide access to remote server based storage for functionality including synchronized document storage, key-value storage, and database services. Key-value storage allows a user application 1602 to share small amounts of data such as user preferences or bookmarks among multiple instances of the user application 1602 across multiple client devices. The user application 1602 can also access server-based, multi-device database solutions via the core app framework 1608.

The systems and methods described herein cart be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 17:
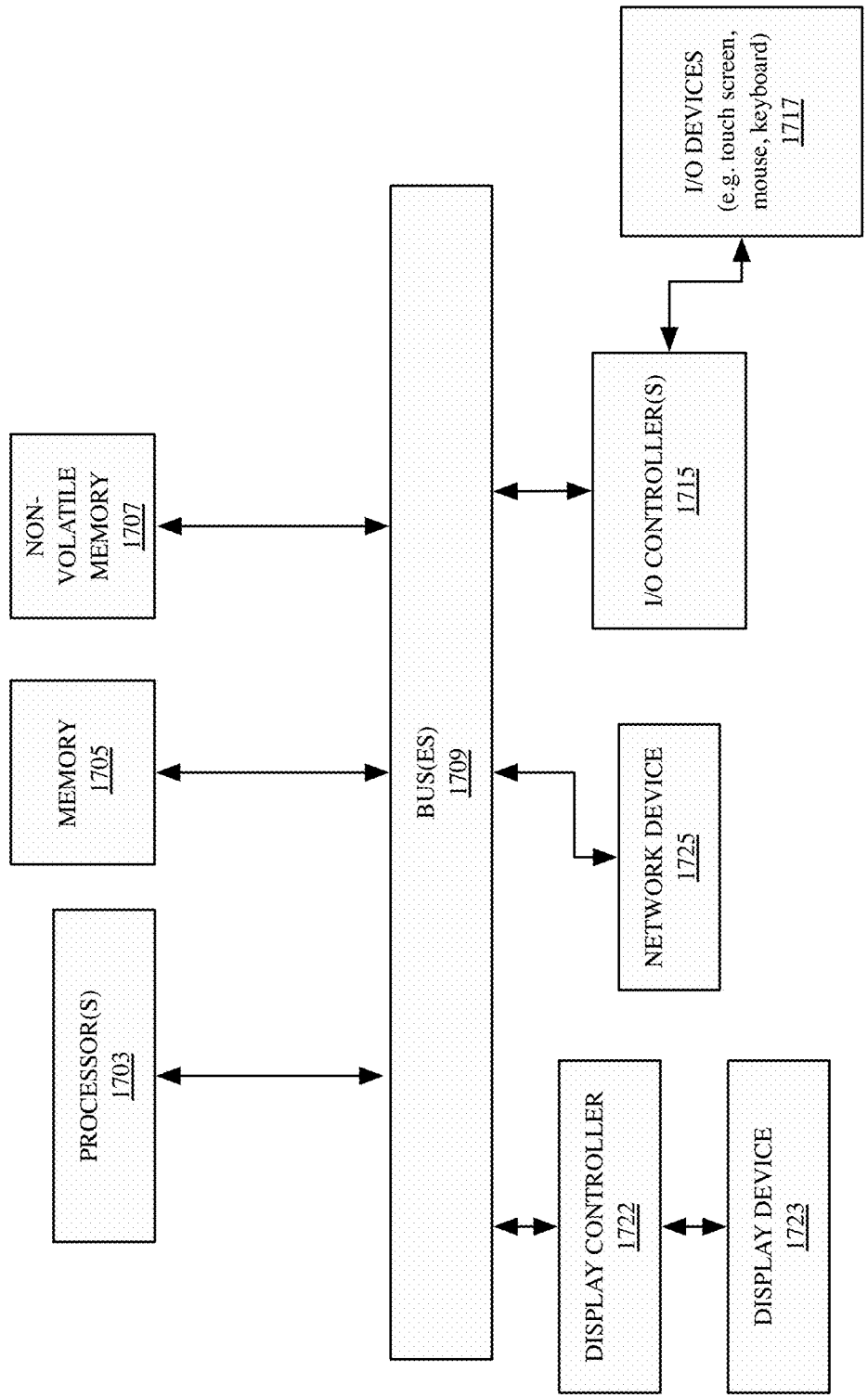
FIG. 17 shows an example of data processing system hardware for use with the present embodiments.

FIG. 17 shows an example of data processing system hardware for use with the present embodiments. Note that while FIG. 17 illustrates the various components of a data processing system, such as a computer system, it is not intended to represent any particular architecture or manner of interconnecting the components as such details are not germane to the present invention. It will also be appreciated that other types of data processing systems that have fewer components than shown or more components than shown in FIG. 17 can also be used with the present invention.

As shown in FIG. 17, the data processing system includes one or more buses 1709 that serve to interconnect the various components of the system. One or more processors 1703 are coupled to the one or more buses 1709 as is known in the art. Memory 1705 may be DRAM or non-volatile RAM or may be flash memory or other types of memory. This memory is coupled to the one or more buses 1709 using techniques known in the art. The data processing system can also include non-volatile memory 1707, which may be a hard disk drive or a flash memory or a magnetic optical drive or magnetic memory or an optical drive or other types of memory systems that maintain data even after power is removed from the system. The non-volatile memory 1707 and the memory 1705 are both coupled to the one or more buses 1709 using known interfaces and connection techniques. A display controller 1711 is coupled to the one or more buses 1709 in order to receive display data to be displayed on a display device 1713 which can display any one of the user interface features or embodiments described herein. The display device 1713 can include an integrated touch input to provide a touch screen. The data processing system can also include one or more input/output (I/O) controllers 1715 which provide interfaces for one or more I/O devices, such as one or more mice, touch screens, touch pads, joysticks, and other input devices including those known in the art and output devices (e.g. speakers). The input/output devices 1717 are coupled through one or more I/O controllers 1715 as is known in the art.

While FIG. 17 shows that the non-volatile memory 1707 and the memory 1705 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1709 can be connected to each other through various bridges, controllers and/or adapters as is well known in the art. In one embodiment the I/O controller 1715 includes one or more of a USB (Universal Serial Bus) adapter for controlling USB peripherals, an IEEE 1394 controller for IEEE 1394 compliant peripherals, or a Thunderbolt controller for controlling Thunderbolt peripherals.

It will be apparent from this description that aspects of the present invention may be embodied, at least in part, in software. That is, the techniques may be carried out in a data processing system in response to its processor executing a sequence of instructions contained in a memory such as the memory 1705 or the non-volatile memory 1707 or a combination of such memories that together may embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, the invention has been described with reference to specific embodiments thereof. It will, however, be evident that various modifications and changes can be made thereto without departing from the broader spirit and scope of the invention. In one embodiment, a non-transitory machine-readable medium stores instructions which, when executed by one or more processors of a computing device, can cause the device to perform operations comprising selecting a region in a first address space in memory of the device, the region storing instructions for execution by one or more processors of the device, dividing the region into multiple clumps, each clump including at least a start page and an end page, and mapping each clump to a random address in a second address space. The instructions in the region can include one or more functions, such as shared library functions.

In one embodiment, the first address space a 64-bit linear virtual memory address space and the instructions for execution include one or more functions. A compiler can provide location and boundary information about the one or more functions or one or more data objects in the linear virtual memory address space. The second address can be a process memory space for a process of an application executing on the data processing system. The region can include a binary load address, a library load address, a dynamic library cache, or a shared object cache. In one embodiment, dividing the region into multiple clumps comprises determining, within a page of the memory, an offset to split the page. The offset to split the page can be used at least in part to determine the start address of a function within a clump.

In one embodiment, mapping each clump to the random address includes mapping a first clump to a first random virtual address and mapping a second clump to a second random virtual address. The first clump can include a first function, the second clump can include a third function, a second function can spans the first clump and the second clump, and each clump can include three or more pages of memory. In one embodiment, the medium can include instructions for additionally mapping the start page of the second clump to an address successive to and contiguous with the end page of the first clump. The end page of the first clump can include the start address of the second function and the start page of the second clump can include the remainder of the second function.

In one embodiment a data processing system comprises one or more processors coupled to memory device, a loader to cause the one or more processors to load a segment of a binary into the memory, a first memory manager to map a first virtual memory address to a first physical address in memory, the first address in a region of the memory including tire segment, a second memory manager to randomly map a second virtual memory address to the first virtual memory address, and a memory view process to present a view of the segment to a user process, wherein the view includes the second virtual memory address.

In one embodiment an electronic device comprises one or more processors coupled to a bus. Also coupled to the bus is a memory device to store a shared library cache. A first process stored on the one or more memory devices can execute on the one or more processors to present a shuffled view of a virtual memory region to a second process, the virtual memory region including a library in the shared library cache. In one embodiment the first process has a linear view of the virtual memory region and is further configured to generate a map between a linear virtual memory address of a memory page to a shuffled virtual memory address of the memory page. The first process can also be associated with an operating system of the data processing system of the electronic device. The second process can be associated with a user account on the electronic device. In one embodiment the first process is further configured to divide a code segment of a library stored in the shared library cache into multiple clumps using a shuffle algorithm, such as an algorithm including a Fisher-Yates shuffle, a Knuth Shuffle, or a variant thereof.

Besides what is described herein, various modifications can be made to the disclosed embodiments and implementations without departing from their scope. Therefore, the illustrations and examples herein should be construed in an illustrative, and not a restrictive sense. The scope and spirit of the various embodiments should be measured solely by reference to the claims that follow.

What is claimed is:

1. An electronic device comprising:
one or more processors coupled to a bus;
coupled to the bus, a memory device to store a shared library cache; and
a first process stored on the memory devices, the first process to cause the one or more processors to present a shuffled view of a shared virtual memory region to a second process,
the shared virtual memory region including a library in the shared library cache,
wherein the shuffled view includes a second set of virtual memory addresses for multiple memory clumps of the library that is generated by at least shuffling a first set of virtual memory addresses associated with the multiple memory clumps, such that the shuffled view of the second set of virtual memory addresses differ from a previous shuffled view of virtual memory addresses presented by the first process,
the multiple memory clumps have an order, at least one of the multiple memory clumps are in units of one or more memory pages,
the first set of virtual memory addresses is contiguous in the multiple memory clumps order, and the second set of virtual memory addresses is discontiguous in the multiple memory clumps order.

2. The electronic device as in claim 1 wherein the first process has a linear view of the shared virtual memory region and is further to generate a map between a linear virtual memory address of a memory page to a shuffled virtual memory address of the memory page.

3. The electronic device as in claim 1 wherein the first process is associated with an operating system of the electronic device and the second process is associated with a user account on the electronic device.

4. The electronic device as in claim 1 wherein the first process is further to divide a code segment of a library in the shared library cache into the multiple clumps of memory, each clump including at least a start page and an end page, and map each clump into an address space in the shuffled view using a shuffle algorithm.

5. The electronic device as in claim 4 wherein the shuffle algorithm includes a Fisher-Yates shuffle, a Knuth Shuffle, or a variant thereof.

6. An electronic device comprising:
one or more processors coupled to a bus;
coupled to the bus, a memory device to store a shared library cache and the memory device storing executable instructions which when executed by the one or more processors cause the electronic device to execute a first process:
to cause the one or more processors to present a shuffled view of a shared virtual memory region to a second process, the shared virtual memory region including a library in the shared library cache, wherein the shuffled view includes a second set of virtual memory addresses for multiple memory clumps of the library that is generated by at least shuffling a first set of virtual memory addresses associated with the multiple memory clumps, such that the shuffled view of the second set of virtual memory addresses differ from a previous shuffled view of virtual memory addresses presented by the first process, the multiple memory clumps have an order, at least one of the multiple memory clumps are in units of one or more memory pages, the first set of virtual memory addresses is contiguous in the multiple memory clumps order, and the second set of virtual memory addresses is discontiguous in the multiple memory clumps order.

7. The electronic device as in claim 6 wherein the first process has a linear view of the shared virtual memory region and is further to generate a map between a linear virtual memory address of a memory page to a shuffled virtual memory address of the memory page.

8. The electronic device as in claim 6 wherein the first process is associated with an operating system of the electronic device and the second process is associated with a user account on the electronic device.

9. The electronic device as in claim 6 wherein the first process is further to divide a code segment of a library in the shared library cache into multiple clumps of memory, each clump including at least a start page and an end page, and map each clump into an address space in the shuffled view using a shuffle algorithm.

10. The electronic device as in claim 9 wherein the shuffle algorithm includes a Fisher-Yates shuffle, a Knuth Shuffle, or a variant thereof.

11. A non-transitory machine readable medium storing executable instructions which when executed by a data processing system cause the data processing system to perform a method comprising:
storing a shared library cache; and
presenting, by a first process, a shuffled view of a shared virtual memory region to a second process, the shared virtual memory region including a library in the shared library cache, wherein the shuffled view includes a second set of virtual memory addresses for multiple memory clumps of the library that is generated by at least shuffling a first set of virtual memory addresses associated with the multiple memory clumps, such that the shuffled view of the second set of virtual memory addresses differ from a previous shuffled view of virtual memory addresses presented by the first process, the multiple memory clumps have an order, at least one of the multiple memory clumps are in units of one or more memory pages, the first set of virtual memory addresses is contiguous in the multiple memory clumps order, and the second set of virtual memory addresses is discontiguous in the multiple memory clumps order.

12. The non-transitory medium as in claim 11 wherein the first process has a linear view of the shared virtual memory region and is further to generate a map between a linear virtual memory address of a memory page to a shuffled virtual memory address of the memory page.

13. The non-transitory medium as in claim 11 wherein the first process is associated with an operating system of the electronic device and the second process is associated with a user account on the electronic device.

14. The non-transitory medium as in claim 11 wherein the first process is further to divide a code segment of a library in the shared library cache into multiple clumps of memory, each clump including at least a start page and an end page, and map each clump into an address space in the shuffled view using a shuffle algorithm.

15. The non-transitory medium as in claim 11 wherein the shuffle algorithm includes a Fisher-Yates shuffle, a Knuth Shuffle, or a variant thereof.

16. The electronic device as in claim 1 wherein at least one of the multiple memory clumps is of at least one page in size.

* * * * *